US012629852B2

(12) United States Patent
Laube et al.

(10) Patent No.: US 12,629,852 B2
(45) Date of Patent: May 19, 2026

(54) MODULAR CLIPPERS

(71) Applicant: WORX4U2, INC., Oxnard, CA (US)

(72) Inventors: Kim Edward Laube, Oxnard, CA (US); Kennan Edward Laube, Oxnard, CA (US); Cole Georgie Laube, Oxnard, CA (US)

(73) Assignee: WORX4U2, INC., Oxnard, CA (US)

( * ) Notice: Subject to any disclaimer, the term of this patent is extended or adjusted under 35 U.S.C. 154(b) by 0 days.

(21) Appl. No.: 18/946,360

(22) Filed: Nov. 13, 2024

(65) Prior Publication Data

US 2025/0339984 A1 Nov. 6, 2025

Related U.S. Application Data

(63) Continuation-in-part of application No. 18/654,214, filed on May 3, 2024, now abandoned.

(51) Int. Cl.
*B26B 19/44* (2006.01)
*B26B 19/28* (2006.01)

(52) U.S. Cl.
CPC .............. *B26B 19/44* (2013.01); *B26B 19/28* (2013.01)

(58) Field of Classification Search
CPC ......... B26B 19/28; B26B 19/12; B26B 19/38; B26B 19/44
See application file for complete search history.

(56) References Cited

U.S. PATENT DOCUMENTS 3,283,192 A * 11/1966 Tolmie ................ B26B 19/3853 310/194
3,440,724 A * 4/1969 Wich ......................... C08J 9/08 30/34.1
3,947,961 A * 4/1976 Meyer ..................... B26B 19/04 30/41
5,259,116 A * 11/1993 Laube ..................... B26B 19/28 30/DIG. 1
5,377,411 A * 1/1995 Andriotis ................ B26B 19/44 30/253
6,887,244 B1 * 5/2005 Walker ................. A61B 17/142 606/80
8,225,512 B2 * 7/2012 Coleman ............. B26B 19/3813 30/41.6
8,418,369 B1 * 4/2013 Laube ................. B26B 19/3893 30/216
8,484,853 B1 * 7/2013 Laube ..................... B26B 19/44 30/216

(Continued)

*Primary Examiner* — Sean M Michalski
(74) *Attorney, Agent, or Firm* — Kevin Schraven; Anooj Patel; Hankin Patent Law, APC

(57) ABSTRACT

A modular clipper, comprising a main body, a first cover plate; and a power adapter, the first cover plate is removeably attached to an upper housing of the main body, and the power adapter is removeably connected to a rear of the main body. The first cover plate is preferably provided in conjunction with drive lever bearing components and a drive lever. The first cover plate, the drive lever bearing components, and the drive lever may be disconnected from the main body and replaced with a second cover plate, a second plurality of drive lever bearing components, and a second drive lever, which are all provided together as a set. Generally, the first cover plate may be disconnected from the main body and replaced with a second cover plate, which may serve a different function.

11 Claims, 21 Drawing Sheets

(56) References Cited

U.S. PATENT DOCUMENTS

| | | | | | |
|---|---|---|---|---|---|
| 8,533,962 | B1 * | 9/2013 | Laube | B26B 19/28 | 30/220 |
| 8,769,824 | B2 * | 7/2014 | Heerlein | B26B 19/24 | 30/216 |
| 9,346,179 | B2 * | 5/2016 | Ziegler | B26B 19/3866 | |
| 9,757,869 | B1 * | 9/2017 | Wada | B26B 15/00 | |
| 9,919,439 | B2 * | 3/2018 | Fu | B26B 19/44 | |
| 2004/0006873 | A1 * | 1/2004 | Cutting | B26B 19/44 | 30/133 |
| 2006/0174487 | A1 * | 8/2006 | Andis | B26B 19/382 | 30/34.05 |
| 2006/0230619 | A1 * | 10/2006 | Williams | B26B 19/44 | 30/133 |
| 2007/0089301 | A1 * | 4/2007 | Arias | B25F 3/00 | 30/277.4 |
| 2008/0072437 | A1 * | 3/2008 | Michel | B26B 19/3846 | 30/201 |
| 2008/0250645 | A1 * | 10/2008 | Tringali | B26B 19/46 | 362/115 |
| 2009/0072782 | A1 * | 3/2009 | Randall | G06F 1/263 | 307/104 |
| 2009/0277012 | A1 * | 11/2009 | Mikula | B26B 19/44 | 30/41.6 |
| 2010/0095534 | A1 * | 4/2010 | Saiz | B24B 23/005 | 279/144 |
| 2010/0186234 | A1 * | 7/2010 | Binder | H04L 5/14 | 348/E5.022 |
| 2011/0185578 | A1 * | 8/2011 | Landrie | A45D 44/00 | 132/200 |
| 2011/0226103 | A1 * | 9/2011 | Caruso | B26D 1/36 | 83/100 |
| 2013/0219724 | A1 * | 8/2013 | Werner | B26B 19/3813 | 30/201 |
| 2013/0239416 | A1 * | 9/2013 | Wevers | B26B 19/20 | 30/201 |
| 2013/0255455 | A1 * | 10/2013 | McCue | B26B 19/06 | 30/223 |
| 2014/0053412 | A1 * | 2/2014 | Carlucci | B26B 19/3846 | 30/241 |
| 2014/0331503 | A1 * | 11/2014 | Uit De Bulten | B26B 19/205 | 30/201 |
| 2014/0352159 | A1 * | 12/2014 | Arndt | B26B 19/06 | 30/216 |
| 2015/0040405 | A1 * | 2/2015 | Kulshreshtha | B26B 19/3853 | 30/277.4 |
| 2015/0224656 | A1 * | 8/2015 | Johnson | B26B 19/44 | 30/133 |
| 2017/0182671 | A1 * | 6/2017 | Fu | B26B 19/3886 | |
| 2018/0281214 | A1 * | 10/2018 | Snow | B26B 19/44 | |
| 2018/0333876 | A1 * | 11/2018 | Darwinkel, I | B26B 19/44 | |
| 2019/0047163 | A1 * | 2/2019 | Lau | B26B 19/06 | |
| 2020/0139564 | A1 * | 5/2020 | Li | B26B 19/3846 | |
| 2020/0164533 | A1 * | 5/2020 | Phoon | B26B 19/12 | |
| 2021/0008738 | A1 * | 1/2021 | Sterzi | B26B 19/04 | |
| 2021/0060804 | A1 * | 3/2021 | Tran | B26B 19/06 | |
| 2023/0302671 | A1 * | 9/2023 | Zhong | B26B 19/44 | |

* cited by examiner

MODULAR CLIPPERS

CROSS-REFERENCE TO RELATED APPLICATIONS

This U.S. Non-Provisional Utility patent application is a Continuation-In-Part Application of U.S. Non-Provisional patent application Ser. No. 18/654,214, filed on May 3, 2024, the contents of which are expressly incorporated herein by this reference, and to which priority is claimed.

FIELD OF USE

The present disclosure relates, in general, to a modular device for clipping hair on animals, humans, fabrics, carpets, and the like. More specifically, the present disclosure relates to an improved clipper device with modularly layered housing, a light cover plate, a vacuum cover plate, a battery power adapter, a corded AC power adapter, and a quick power disconnect.

BACKGROUND

Generally, clippers are a single unit having one function and a single method of powering the clippers. Prior to the clippers of the present disclosure, the only modularity of hair clippers was the interchangeability of the blades and blade guards.

Clippers are typically manufactured and designed with model-specific options and are powered either by a battery or A/C power via a corded connection. Additionally, clippers are designed in an array of different blade speeds, shapes, and sizes, each may serve a different purpose.

Animals such as horses, dogs, cats, and wild animals may have hair density of approximately 4,000 to 1,000,000 hairs per square inch, as compared to human hair, which may have approximately 700 hairs per square inch. Clippers used in heavy-duty conditions, such as conditions involving one or more of dense hair, fur, hair having dirt, debris, feces, tangles, and mats, and/or hair on animals with sores, require clippers to operate at higher strokes per minute (SPM). Clippers operating at higher SPM, generally above 6,000, require heavy-duty components to improve the structural integrity of the mechanical components of the clipper, leading to heavier clippers.

Because each clipper is limited to singular power systems and has a specific function or utility, clipper owners typically own multiple different clipper units, leading to storage and power capacity problems.

Therefore, what is needed is a lightweight, versatile clipper capable of a flexible power system that has modular and flexible configuration.

SUMMARY

To minimize the limitations in the prior art, and to minimize other limitations that will become apparent upon reading and understanding the present specification, the present disclosure discloses a new and useful modular hair clipper.

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented herein below. It is to be understood that both the following general description and the following detailed description are exemplary and explanatory only and are not restrictive.

In order to reduce the complexity and cost of having multiple types of clippers for different tasks and with different sources of power, one embodiment of the present disclosure is a universal modular clipper with a housing that may be composed of multiple modular layers configured to attach to, and complete, a primary clipper housing. The multilayered housing may allow for a universally powered and user-configurable clipper system that minimizes manufacturing complexity and cost.

The modular clipper of the present disclosure may comprise a lower housing, an upper housing, a cover plate, and a power adapter. The modular cover plates may include a standard cover plate, a lighted cover plate, or a vacuum cover plate. The modular cover plates preferably mount to the primary housing and may contain or house miscellaneous mechanical components that typically wear out in a clipper. The modular cover plates are preferably interchangeable and one of which may be a cover plate that has a tune-up kit that allows a user to repair or replace worn mechanical parts.

One embodiment may be a modular clipper, comprising: a main body; a first cover plate; and a power adapter; wherein the first cover plate is removeably attached to an upper housing of the main body; wherein the power adapter may be removeably connected to a rear of the main body; wherein the first cover plate may be provided in conjunction with a first plurality of drive lever bearing components and a first drive lever; wherein the main body may house a motor, a drive shaft, and a motor cam; and wherein the power adapter may be configured to supply power to the motor. The first cover plate, the first plurality of drive lever bearing components, and the first drive lever may be configured to be disconnected from the main body and replaced with a second cover plate, a second plurality of drive lever bearing components, and a second drive lever, which may be all provided together as a set. The first cover plate may be configured to be disconnected from the main body and replaced with a second cover plate. The first cover plate may be selected from the group of cover plates consisting of: a plain cover plate; a light cover plate; a vacuum cover plate; and a light and vacuum cover plate. The first cover plate may comprise an upper lever bearing platform, a drive post, one or more thrust pin sockets, one or more electrical contact sockets, and one or more cover plate electrical contacts. The lower housing of the main body may comprise a lower housing bearing platform and a lower housing drive post receiver cavity. The first plurality of drive lever bearing components may comprise: an upper thrust top plate; an upper ball bearing thrust plate; an upper thrust bottom plate; a drive lever bearing; a drive post pin; a lower thrust top plate; a lower ball bearing thrust plate; and a lower thrust bottom plate. The first plurality of drive lever bearing components may be configured to matingly engage with each other and with the first drive lever, the drive post, the upper lever bearing platform, and the lower housing bearing platform. The drive post pin may be configured to matingly engage with the lower housing drive post receiver cavity, the drive lever bearing, and the drive post cavity. The first plurality of drive lever bearing components further comprise one or more thrust pins, which may be configured to matingly engage with the one or more thrust pin sockets. The lower housing may further comprise one or more bias elements and one or more electrical contacts, wherein the one or more electrical contacts may be configured to deliver power from the power adapter to the one or more cover plate electrical contacts. The first cover plate may comprise one or more lights. The one or more lights may be one or more light emitting diodes. The first cover plate may further comprise: a cover plate vacuum conduit; and a nozzle; wherein the upper housing of the main body comprises an upper housing vacuum conduit; wherein the power adapter may comprise a power adapter vacuum conduit and a vacuum receptacle; wherein the cover plate vacuum conduit, the nozzle, the upper housing vacuum conduit, and the vacuum receptacle may be in fluidic communication, such that when a vacuum source may be removeably connected to the vacuum receptacle, the nozzle may be configured to suction in a plurality of loose hairs that are cut by the modular clipper. The first cover plate may further comprise one or more lights. Alternatively or additionally, the first cover plate may further comprise: a cover plate vacuum conduit; a nozzle; and a vacuum receptacle; wherein the cover plate vacuum conduit, said nozzle, and said vacuum receptacle may be in fluidic communication, such that when a vacuum source may be removeably connected to said vacuum receptacle, said nozzle may be configured to suction in a plurality of loose hairs that are cut by said modular clipper. The power adapter may be selected from the group of power adapters consisting of: a rechargeable battery power adapter and an A/C power adapter. It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE ILLUSTRATIVE EMBODIMENTS

Figure 1:
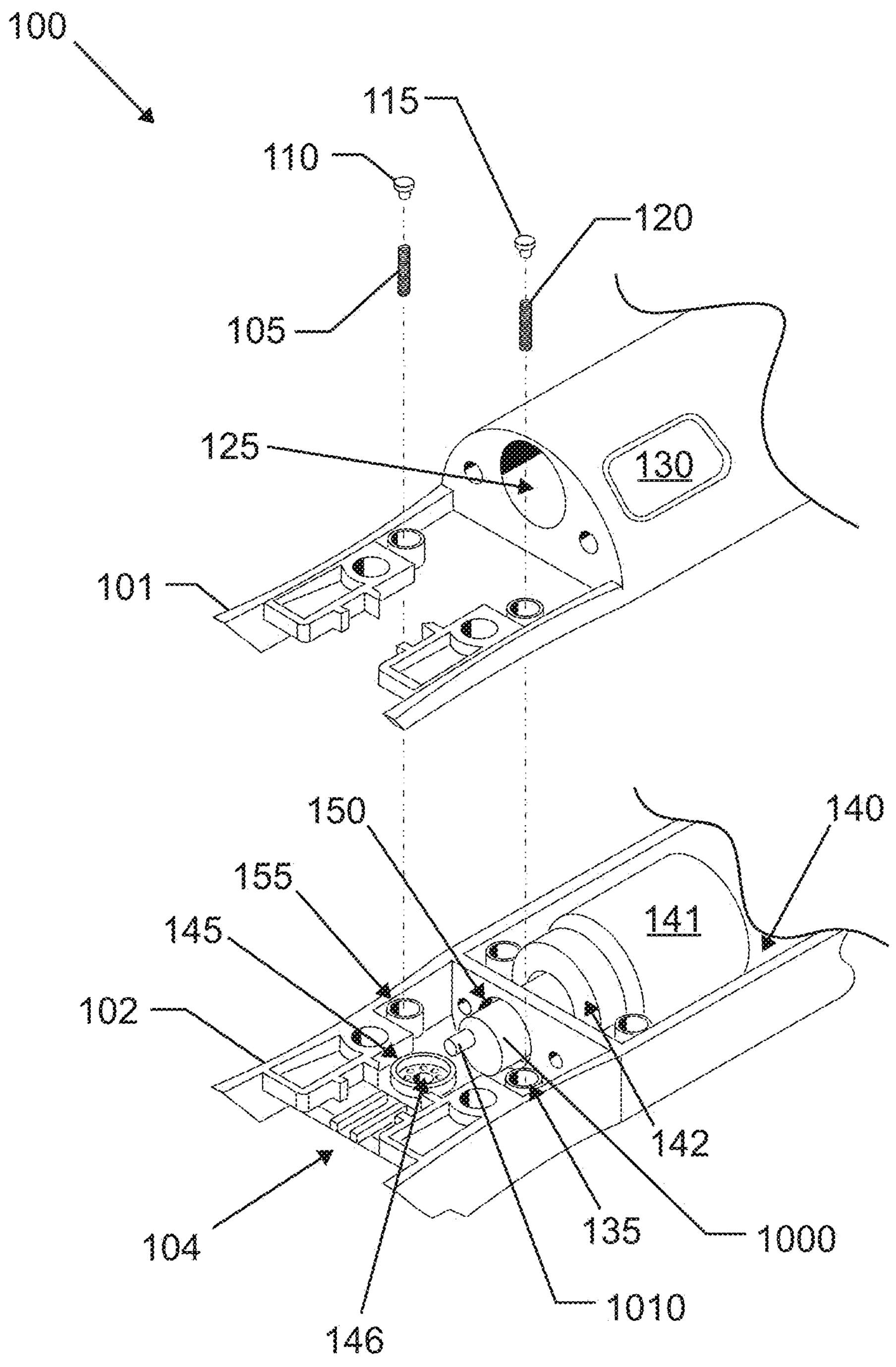
FIG. 1 is an illustration of an exploded view of one embodiment of the lower housing and upper housing of the modular clipper.

In the following detailed description of various embodiments of the present disclosure, numerous specific details are set forth in order to provide a thorough understanding of various aspects of one or more embodiments of the present disclosure. However, one or more embodiments of the present disclosure may be practiced without some or all of these specific details. In other instances, well-known methods, procedures, and/or components have not been described in detail so as not to unnecessarily obscure aspects of embodiments of the present disclosure.

While multiple embodiments are disclosed, still other embodiments of the devices, systems, and methods of the present disclosure will become apparent to those skilled in the art from the following detailed description, which shows and describes illustrative embodiments of the devices, systems, and methods of the present disclosure. As will be realized, the devices, systems, and methods of the present disclosure are capable of modifications in various obvious aspects, all without departing from the spirit and scope of the present disclosure. Accordingly, the screenshot figures, and the detailed descriptions thereof, are to be regarded as illustrative in nature and not restrictive. Also, the reference or non-reference to a particular embodiment of the devices, systems, and methods of the present disclosure shall not be interpreted to limit the scope of the present disclosure.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms “a,” “an,” and “the” include plural referents unless the context clearly dictates otherwise. Ranges may be expressed herein as from “about” one particular value, and/or to “about” another particular value. When such a range is expressed, another embodiment includes from the one particular value and/or to the other particular value. Similarly, when values are expressed as approximations, by use of the antecedent “about,” it will be understood that the particular value forms another embodiment. It will be further understood that the endpoints of each of the ranges are significant both in relation to the other endpoint, and independently of the other endpoint.

“Optional” or “optionally” means that the subsequently described event or circumstance may or may not occur, and that the description includes instances where said event or circumstance occurs and instances where it does not.

Throughout the description and claims of this specification, the word “comprise” and variations of the word, such as “comprising” and “comprises,” means “including but not limited to,” and is not intended to exclude, for example, other components, integers or steps. “Exemplary” means “an example of” and is not intended to convey an indication of a preferred or ideal embodiment. “Such as” is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

In the following description, certain terminology is used to describe certain features of one or more embodiments. For purposes of the specification, unless otherwise specified, the term “substantially” refers to the complete or nearly complete extent or degree of an action, characteristic, property, state, structure, item, or result. For example, in one embodiment, an object that is “substantially” located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of “substantially” is also equally applicable when used in a negative connotation to refer to the complete or near complete lack of an action, characteristic, property, state, structure, item, or result.

As used herein, the terms “approximately” and “about” generally refer to a deviance of within 5% of the indicated number or range of numbers.

As used herein the term “power adapter” refers to a power supply, alternating current (A/C) or direct current (D/C), and may comprise one, more, or all of: an adapter that converts A/C power to D/C power, a battery, a replaceable battery, a rechargeable battery, charging cords, connectors, transformers, and power connectors.

Typically, the clipper motor may be a 12 volt motor that may operate with a 12V electrical supply of current to the motor. A 100V-240V, 50-60 Hz input may be utilized with a 12V output transformer. A 12V transformer may allow the present invention to plug into any voltage worldwide and power the clipper. Additionally, the clippers of the present disclosure may be configured to be able to plug into any 12-volt vehicle and power the clippers. Preferably, the battery pack may be comprised of individual battery cells that, alone or, as preferred, in combination, equal 12V to power the clipper motor.

In some embodiments, the power adapter may have a cord for supplying power to the motor and/or for recharging a battery pack. The power adapter may have one or more electrical printed circuit boards and may utilize pulse width modulations (pwm) circuitry along with switch controls to make variable speed controls of the motor without loss of clipping torque, which is an improvement over systems and devices that utilize a reduction of voltage to regulate the clipping speeds. Voltage reduction starves the motor of its clipping power and causes the clipper to jam up, pulling the hair and eventually causes failure to clip hair effectively at lower speeds. It is critical to have lower cutting speeds available in a clipper to prevent the hair clipper cutting blades from getting too hot and burning the skin and hair. The operator of the modular clippers of the present disclosure, with pulse width modulation has the choice of lowering the speeds to prevent overheating the clipping blades in sensitive areas like face, cars, eyes and other body areas, and yet is still able, at will to speed the clipper blades faster in thicker, dense, non-sensitive areas of the body, all without losing cutting torque at any speed.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

Depending on the intended use, rotary and magnetic vibrating motors are typically used in the professional clipper industry. Rotary motor clippers generally produce more torque and power and are typically directed for use on large animals such as but not limited to horses, cattle, and other animals with dense fur or hair. Magnetic vibrating motors are generally not as powerful as a rotary motor and are used for less demanding purposes, such as normal human hair. Clippers operating at 2,000 SPM to 10,000 SPM (SPM is strokes per minute) are typically referred to as heavy-duty and frequently use rotary motors.

A stroke is when the drive lever moves in one direction, left or right. A subsequent stroke is when the drive lever moves in the opposite direction. Slower SPM clippers typically remove hair at a slower removal rate, and higher SPM clippers typically remove hair at a higher removal rate. The SPM speed typically defines the rate at which clippings are removed from an animal. Higher SPM may produce a smoother hair finish and may reduce choppy, uneven, staggered, broken hair shafts, uncut hairs, and/or pulled hairs from the skin.

The clippers of the present disclosure may operate from 2,000 to 10,000 SPM, depending on the speed controls applied, and may be adjusted slower or faster as needs change.

FIG. 1 is an illustration of an exploded view of one embodiment of the lower housing and upper enclosure of the modular clipper. As shown, portion of modular clipper 100 may comprise lower housing 102 and upper housing 101. Lower housing 102 and upper housing 101 preferably may be combined to form the main body of portion of modular clipper 100.

In one embodiment, lower housing 102 may include mechanical component cavity 104, motor aperture 150, motor cavity 140, motor 141, drive shaft 142, cam 1000, offset pin 1010, negative electrical cavity 135, lower housing bearing platform 145, lower housing drive post receiver cavity 146, and positive electrical cavity 155. Mechanical component cavity 104 preferably allows a removeable blade to be attached to the drive lever and/or lower housing 102. The mechanical components that are housed by lower housing 102 may include the drive lever bearing components shown in FIG. 2 related to cover plate 200, the drive lever bearing components shown in FIG. 3 related to light cover plate 300, the drive lever bearing components shown in FIG. 4 related to vacuum cover plate 400, and a drive lever, such as drive levers 1100 and 1200. Bias element 105 and bias element 120 may be mounted in negative electrical cavity 135 and positive electrical cavity 155, respectively, where bias element 105 and bias element 120 exert a biasing force to positive electrical contact 110 and negative electrical contact 115. Positive electrical contact 110 and negative electrical contact 115 may conduct electrical power from power adapter 900 (shown in FIG. 9). Motor aperture 150 may allow the cam 1000 to connect to drive shaft 142 of the motor 141. Motor cavity 140 may preferably also contain and support electronic controls, electrical wiring, and the like.

Figure 4:
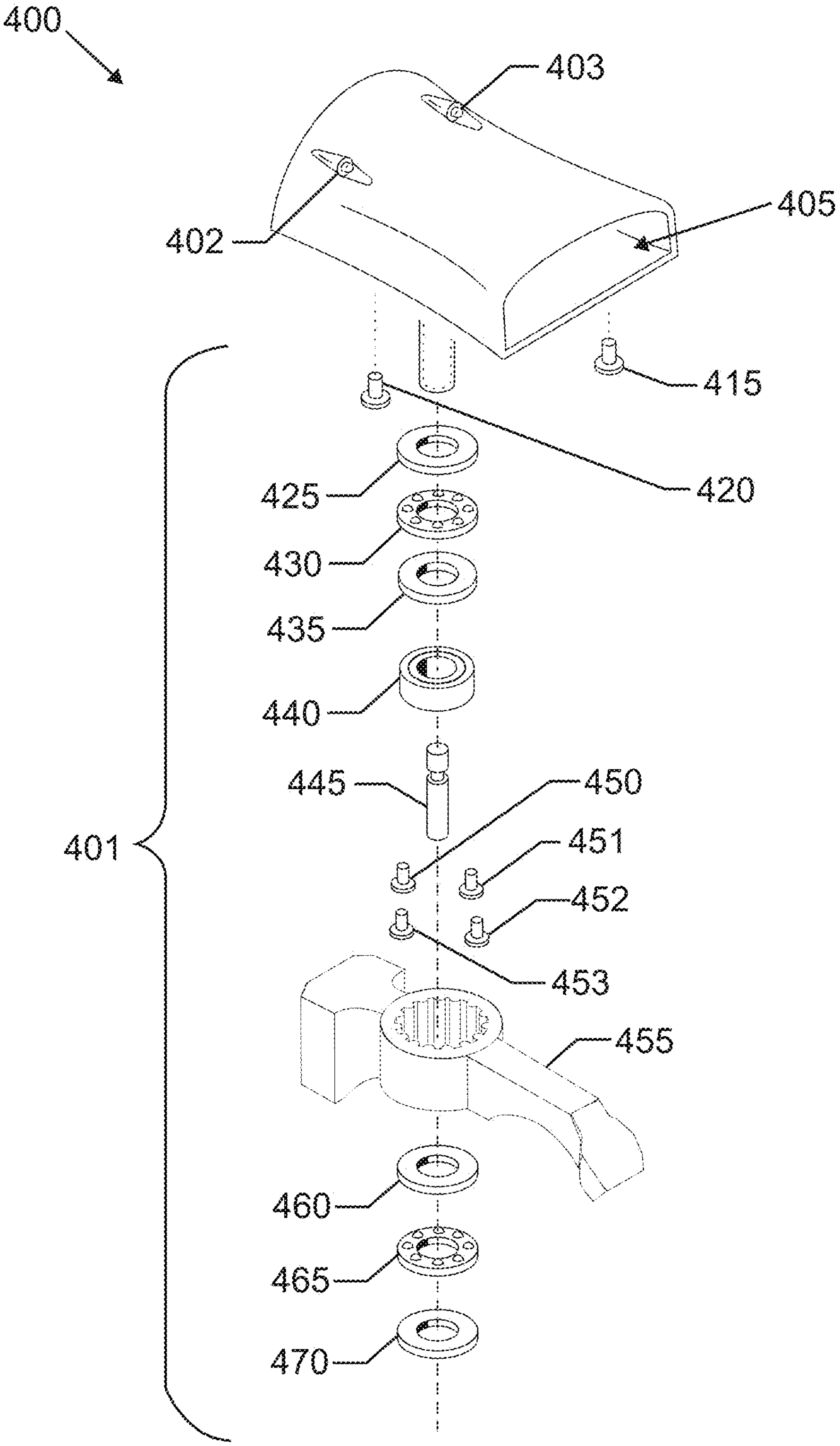
FIG. 4 is an illustration of an exploded top view of one embodiment of a vacuum cover plate and drive lever bearing components.

In one embodiment, upper housing 101 may include conduit 125 and adjustable vacuum button 130. Conduit 125 may allow for fluidic communication from vacuum cover plate 400 (as shown in FIG. 4) to the rear of modular clipper 100. Conduit 125 may be configured to fluidically remove debris and cut hair from the upper and lower housing 101, 102, and then be disposed of through the rear of modular clipper 100. Adjustable vacuum button 130 may allow the suction levels of the vacuum to be adjusted and for turning on and off. Preferably, portion of modular clipper 100 may have a power button that may allow the clippers to be operated, such as being turned on or off. The power button may also be a multi-functional button that enables the selection of differing speeds or strokes per minute, turning the light on and off, or controlling the vacuum.

An alternative embodiment, upper housing 101 may not include conduit 125.

Lower housing 102 and upper housing 101 may be matingly connected to each other using fasteners, connectors, screws, latches, bolts, nuts, pins, joints, locking seams, friction, or the like to hold the lower housing 102 and upper housing 101 together. In other embodiments the lower housing 102 and upper housing 101 may be permanently connected, such as via adhesive or ultrasonic welding, or may be parts of a unitary body. Preferably, the cover plates are removeably attached to at least the upper housing 101 of the main body via various types of connectors, such as, but not limited to, screws, nuts, bolts, and the like.

Lower housing 102 and upper housing 101 may preferably be made from any of plastics, composite materials, and/or metals. For the lowest cost combined with a low weight-to-strength ratio, lower housing 102 and upper housing 101 may be made from plastics and formed using plastic extrusion manufacturing techniques. Where costs and weight are not of concern, metals, and complex composite materials may be used to form lower housing 102 and upper housing 101.

Lower housing 102 and upper housing 101 may also allow cover plate 200 (shown in FIG. 2), light cover plate 300 (shown in FIG. 3), vacuum cover plate 400 (shown in FIG. 4) to be separately and interchangeably attached to form a modular clipper.

Figure 2:
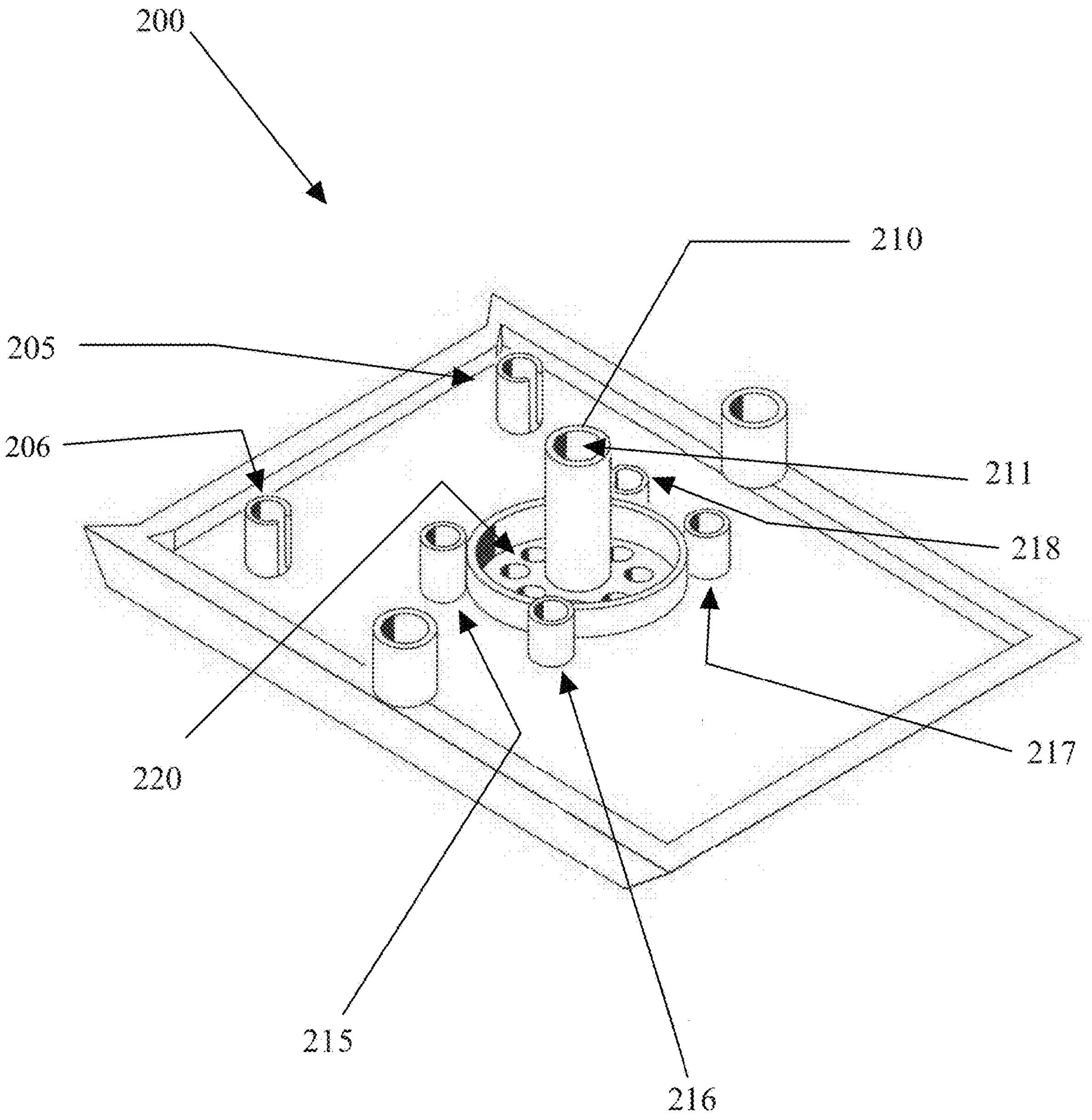
FIG. 2 is an illustration of a bottom view of one embodiment of a cover plate.

FIG. 2 is an illustration of a bottom view of one embodiment of a cover plate. Cover plate 200, which may preferably be provided to the consumer as a kit with a drive lever and drive bearings. This allows for the various types of cover plates to be interchangeable with each other. Further, each of the parts of the drive lever and drive bearings kit may be easily replaced by the user by removing the cover plate. Cover plate 200 may preferably include electrical contact sockets 205, 206, drive post 210, thrust pin sockets 215, 216, 217, 218 and upper lever bearing platform 220.

Electrical contact sockets 205, 206 may be in electrical contact with negative electrical contact 115 and positive electrical contact 110, respectively, to conduct electrical power from lower housing 102 into cover plate 200. In other embodiments, if cover plate 200 does not have the need for electricity, the contact sockets 205, 206 matingly engage with contacts 110, 115, respectively. Drive post 210 may allow for mounting of a drive lever (shown in FIG. 3 and FIG. 4). Thrust pin sockets 215, 216, 217, 218 may matingly engage with thrust pins 350, 351, 352, 353, shown in FIG. 3, or may matingly engage with thrust pins 450, 451, 452, 453, shown in FIG. 4. FIG. 2 also shows that drive post 210 may have drive post cavity 211 that may matingly engage with a drive post pin, such as drive post pin 345 (shown in FIG. 3).

Figure 3:
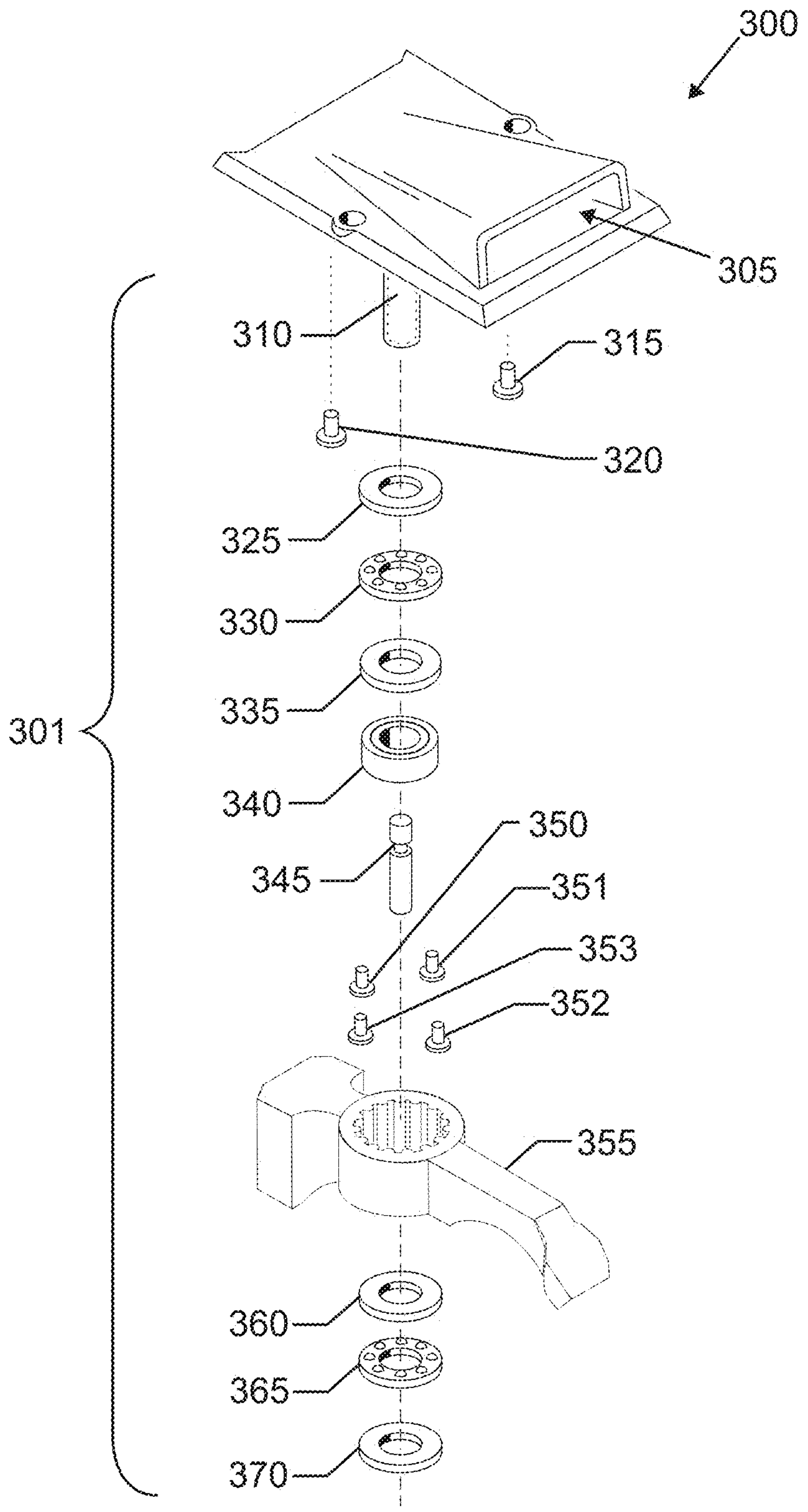
FIG. 3 is an illustration of an exploded top view of one embodiment of a light cover plate and drive lever bearing components.

Upper lever bearing platform 220 may allow for the mounting of drive lever bearing components (as shown in FIG. 3 and FIG. 4) and/or the installation of mechanical lubricant such as grease to minimize heat and friction forces. Upper lever bearing platform 220 may receive all or portions of the drive lever bearing components (as shown in FIG. 3 and FIG. 4).

Cover plate 200 may be made from any plastics, composite materials, or metals. For the lowest cost combined with a low weight-to-strength ratio, it may be made from plastics and formed using plastic extrusion manufacturing techniques. Where costs and weight are not of concern, metals, and complex composite materials may be used to form cover plate 200.

The features of cover plate 200, such as thrust pin sockets 215, 216, 217, 218, holes, or texture (not shown), may reduce or stop sinkage of drive lever bearing components 301 (shown in FIG. 3) or drive lever bearing components 401 (shown in FIG. 4). Reducing sinkage may allow portion of modular clipper 100 to retain full-stroke capability even after extended duration of use.

Cover plate 200 may be plain cover with no powered feature, or it may be a light cover, as shown in FIG. 3.

FIG. 3 is an illustration of an exploded top view of one embodiment of a light cover plate and drive lever bearing components. Light cover plate 300 may include one or more lights 305, electrical contacts 315, 320, and drive post 310. Drive lever bearing components 301, which may preferably be provided to the customer with cover plate 300, may include upper thrust top plate 325, upper ball bearing thrust plate 330, upper thrust bottom plate 335, drive lever bearing 340, drive post pin 345, thrust pins 350, 351, 352, 353, drive lever 355, lower thrust top plate 360, lower ball bearing thrust plate 365, and lower thrust bottom plate 370. Drive lever bearing components 301 are preferably stacked to form the drive lever and bearings that allow the drive lever 355 to stroke back and forth. Because the drive lever 355, drive lever bearing components 301, and light cover plate 300 are preferably sold as a set, the user may easily access the drive lever bearing components 301 and/or the drive lever 355 in order to replace one or more of the components (one at a time or all at once). By having the parts that are most likely to wear out (such as the drive lever bearing components 301) be part of a kit that comes with the modular cover plates, the user can maintain the main part of the clippers (body, motor, battery, cam, power connector, and the like) and easily replace the parts that wear out the fastest. This also allows the user to swap in and out different drive levers and different cover plates in a fast and easy manner.

In one embodiment, when the modular clippers are assembled, lower thrust bottom plate 370 may be in contact with lower housing bearing platform 145 and upper thrust top plate 325 may be in contact with, for example, upper lever bearing platform 220. The bearings/bearing platforms 145, 220, 330, 340, and 365 may allow for the drive lever to make smooth strokes back and forth, while being held firmly in place between the cover plate and the lower housing. The bearings may each have a plurality of ball bearings that operate to reduce friction as the drive lever performs the side-to-side strokes. The ball bearings are typically made of metal but may be made of other materials.

Light cover plate 300 may preferably be removably attached to lower housing 102 and upper housing 101. The back end of drive lever 355 may engage an offset pin of a cam.

In one embodiment, one or more lights 305 may be an array of light emitting diodes ("LEDs"), with or without a lens, cover, or diffuser, to form a headlight. Electrical contacts 315 and 320 may conduct electrical power from positive electrical contact 110 and negative electrical contact 115, as shown in FIG. 1 such that the lights 305 may be powered by the power source of the clippers (A/C or battery). The lights 305 of light cover plate 300 may improve visibility when operating the modular clippers.

Drive lever bearing components 301 may wear out, break, require service, or may be replaced to include additional capabilities or features. Additional capabilities may include changes in angle, improved strength, reduced weight, or the like. For example, drive lever 355 may be an angle from 75 to 125 degrees. Drive lever bearing components 301 may be pivotably connected to drive post 310 and stabilized by drive post pin 345, the top of which may engage with, or fit into, the drive post cavity 211 and the bottom of which may engage with, or fit into, lower housing drive post receiver cavity 146.

Drive post pin 345 may assist in reducing or stopping wrenching or slippage of the inner portion of drive lever bearing 340, drive lever 355, and drive post 310. Thrust pins 350, 351, 352, 353 may absorb heat and prevent sinkage, wearing, and stroke loss of drive lever 355 and/or the drive lever bearing components.

Drive lever 355 and/or the drive lever bearing components may be made from metals, plastics, or composite materials. Using metal may improve component wear properties but also increase weight, increase heat transfer, and cause the clippers to be very loud when in use, which can be disturbing to animals and humans. Plastics may improve weight and heat transfer, and may be much quieter, but may be susceptible to wearing faster than desired. Composites may improve weight and heat transfer properties but may increase costs to replace components. Components made of plastic may be preferable due to lower costs and ease of replacement.

FIG. 4 is an illustration of an exploded top view of one embodiment of a vacuum cover plate and drive lever bearing components. Vacuum cover plate 400 may include nozzle 404, vacuum conduit 405, electrical contacts 415 and 420, lights 402, 403, and drive post 410.

Drive lever bearing components 401, which may preferably be provided to the customer with cover plate 400, may include, as shown, upper thrust top plate 425, upper ball bearing thrust plate 430, upper thrust bottom plate 435, drive lever bearing 440, drive post pin 445, thrust pins 450, 451, 452, 453, drive lever 455, lower thrust top plate 460, lower ball bearing thrust plate 465, and lower thrust bottom plate 470. Drive lever bearing components 401 are preferably stacked to form the drive lever and bearings that allow the drive lever 455 to stroke back and forth in a smooth and fast manner. Because the drive lever 455, drive lever bearing components 401, and vacuum cover plate 400 are preferably sold as a set, the user may easily access the drive lever bearing components 401 and/or the drive lever 455 in order to replace one or more of the components (one at a time or all at once). By having the parts that are most likely to wear out (such as the drive lever bearing components 401) be part of a kit that comes with the modular cover plates, the user can maintain the main part of the clippers (body, motor, battery, cam, power connector, and the like) and easily replace the parts that wear out the fastest without having to take the entire machine apart. This also allows the user to swap in and out different drive levers and different cover plates in a fast and efficient manner.

In one embodiment, lights 402, 403 may be LEDs that provide light during operation. Electrical contacts 415 and 420 may conduct electrical power from positive electrical contact 110 and negative electrical contact 115, (shown in FIG. 1) such that the lights 402, 403 may be powered by the power source of the clippers (A/C or battery). The lights 402, 403 of vacuum cover plate 400 may improve visibility when operating the modular clippers.

Preferably, drive lever bearing components 401, fit together with drive post 410 in a manner similar to that of drive lever bearing components 301 and drive post 310.

In addition to providing light, vacuum cover plate 400 may vacuum up and pass loose hairs that are cut by the blade of the clippers. The vacuum suction may come from vacuum conduit 125 (shown in FIG. 1), which may be operatively connected to vacuum conduit 405, which starts at nozzle 404.

Figure 5:
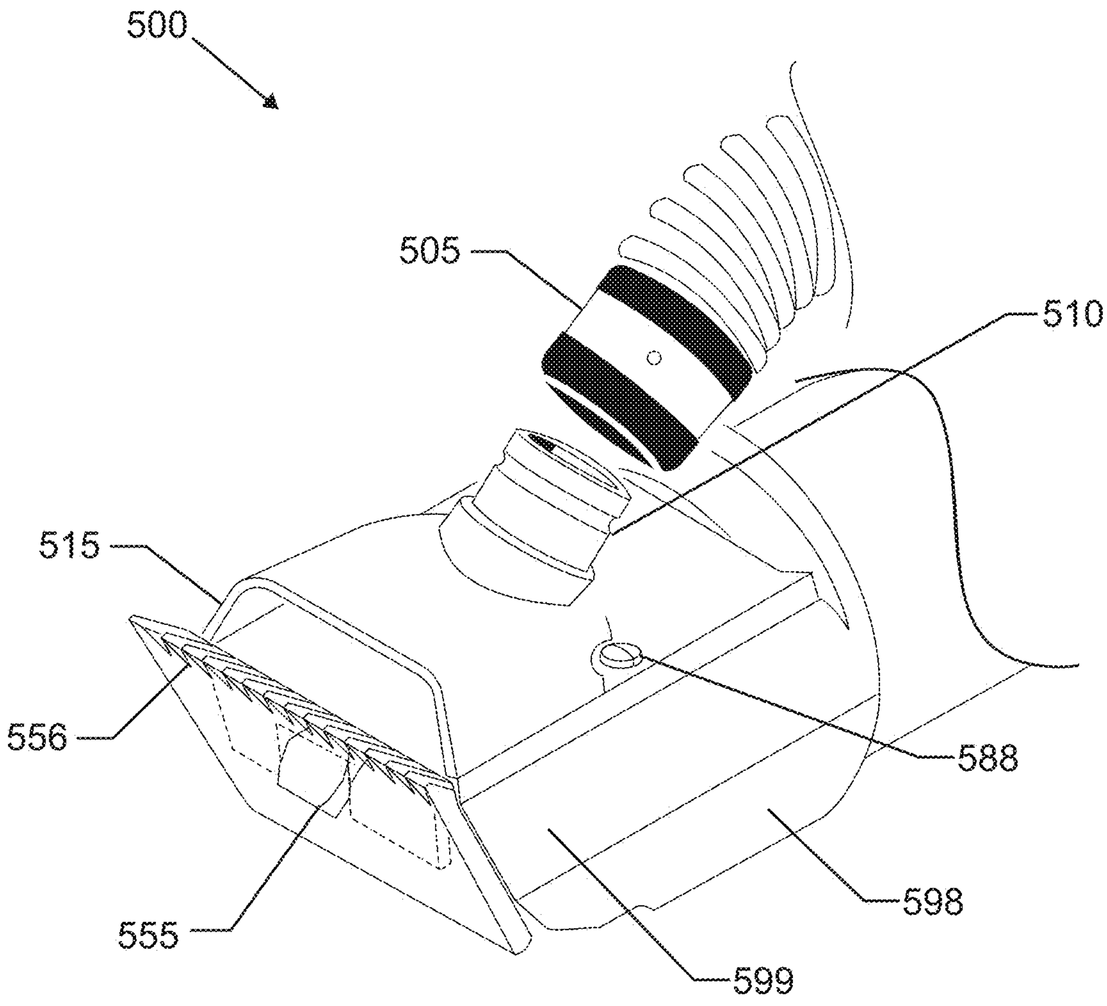
FIG. 5 is an illustration of a top perspective view of an alternate embodiment of a vacuum cover plate.

FIG. 5 is an illustration of a perspective view of an alternate embodiment of a vacuum cover plate. Vacuum cover plate 500 may include nozzle 515, air or vacuum conduit 520, and vacuum receptacle 510. In this embodiment, vacuum cover plate 500 is removeably attached to upper housing 599 via screws 588. Upper housing 599, which is connected to lower housing 598, does not include an air conduit, such as conduit 125, shown in FIG. 1. To add a vacuum feature to the modular clipper of the present disclosure without the upper housing having a vacuum or air conduit, vacuum cover plate 500 may include vacuum receptacle 510, which may be directly attached to vacuum hose 505 in order to remove cut hair through nozzle 515 during operation the modular clippers. During use, vacuum hose 505 may provide a removal vacuum airflow where hair is pulled into nozzle 515 and through vacuum conduit 520 after being clipped, and then finally removed through vacuum hose 505.

FIG. 5 also shows that nozzle 515 is directly above drive lever 555, which is attached to blade 556.

Figure 6:
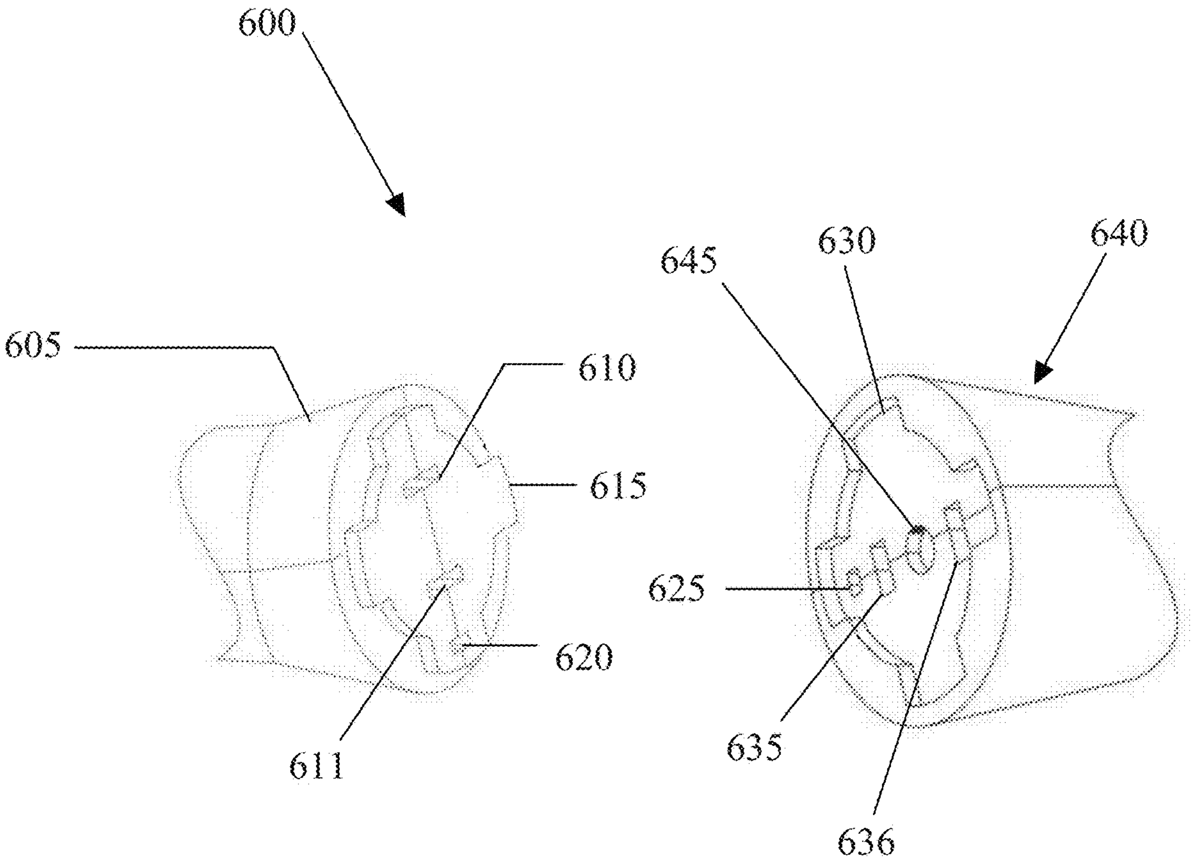
FIG. 6 is an illustration of one embodiment of a quick power disconnect.

FIG. 6 is an illustration of one embodiment of a quick power disconnect. Portion of modular clippers 600 may have a power adapter 640 that is configured to removeably attach to the rear of main body 605.

Rear of main body 605 may have one or more power contacts 610, 611, one or more retaining features 615, and locking feature 620. One or more power contacts 610 may accept electrical power from power adapter 640.

Power adapter 640 may include one or more adapter power contacts 635, 636, adapter locking feature 625, adapter charging/recharging port 645, and one or more adapter retaining features 630.

The one or more retaining features 615 of main body 605 may be female or male (as shown), and the one or more adapter retaining features 630 may be female (as shown) or male. The one or more retaining features 615 and adapter retaining features 630 are preferably mirrors of each other and may allow the rear of main body 605 to matingly and removeably attach and/or engage with power adapter 640, such that the power contacts and locking features line up and engage as well. Power adapter 640 may preferably be rotated in either direction or locked in place while the modular clippers are operated. Adapter locking feature 625 may engage locking feature 620 while the modular clippers are being operated to keep power adapter 640 attached to the rear of main body 605. Power adapter 640 may be a battery (D/C) pack or may be an A/C power adapter that has a power cord that can be plugged into an A/C power supply.

Figure 7:
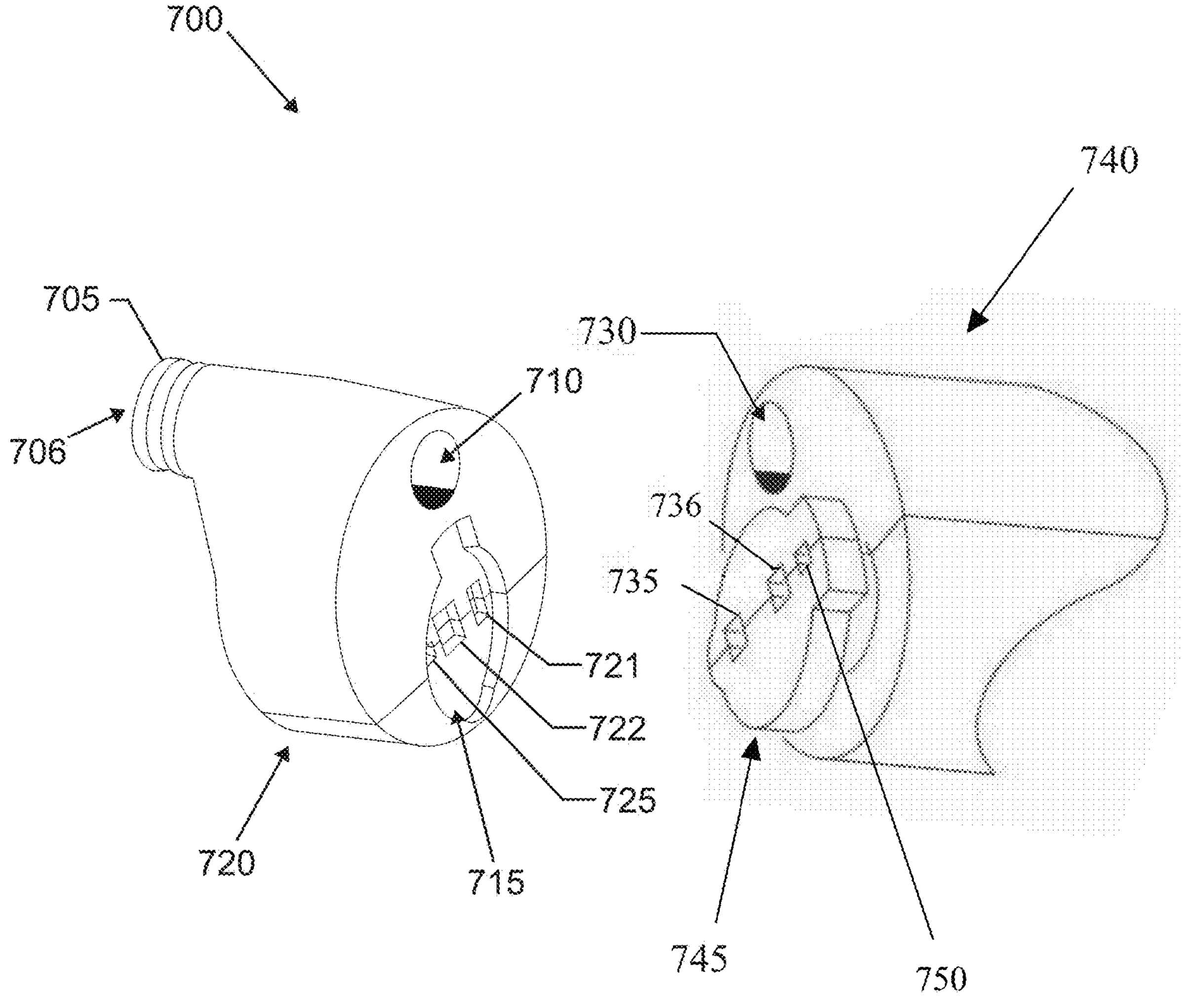
FIG. 7 is an illustration of an alternate embodiment of a twist lock quick power disconnect.

FIG. 7 is an illustration of an alternate embodiment of twist lock a quick power disconnect. As shown, portion of modular clippers 700 may include main body 740 and power adapter 720. Main body 740 may have a rear portion shown in FIG. 7 that may include upper housing vacuum/air conduit 730, one or more power contacts 735, 736, male twist lock retaining feature 745, and locking feature 750.

Power adapter 720, as shown, may include one or more adapter power contacts 721, 722, female twist lock retaining feature 715, adapter locking features 725, main body to power adapter vacuum transition 710, vacuum outlet 706, and vacuum attachment fixture 705.

The male twist lock retaining feature 745 is shown as male but may be a female feature in alternative embodiments. The female twist lock retaining feature 715 of power adapter 720 is shown as female but may be a male feature in alternative embodiments. Retaining features 745 and 715, preferably matingly engage and then twist with respect to each other to be locked removeably in place. When locked in place, the vacuum conduits 730 and 710, the locking features 725, 750, and the power contacts 735, 736, 721, 722, all match up to allow connectivity and stability between main body 740 and power adapter 720.

Power adapter 720 may preferably be rotated in either direction and may be locked in place while the modular clippers are operated. Locking feature 725 may engage locking feature 750 while the modular clippers are being operated.

Main body to power adapter vacuum transition 710 and vacuum conduit 730 may align and form a single conduit from a nozzle, such as nozzle 404 (shown in FIG. 4) through an upper housing, such as upper housing 101 (shown in FIG. 1), to vacuum outlet 706. The single conduit may allow for the removal and collection of cut hair. An external vacuum, vacuum tube, or suction source may be attached to vacuum attachment fixture 705.

Figure 8:
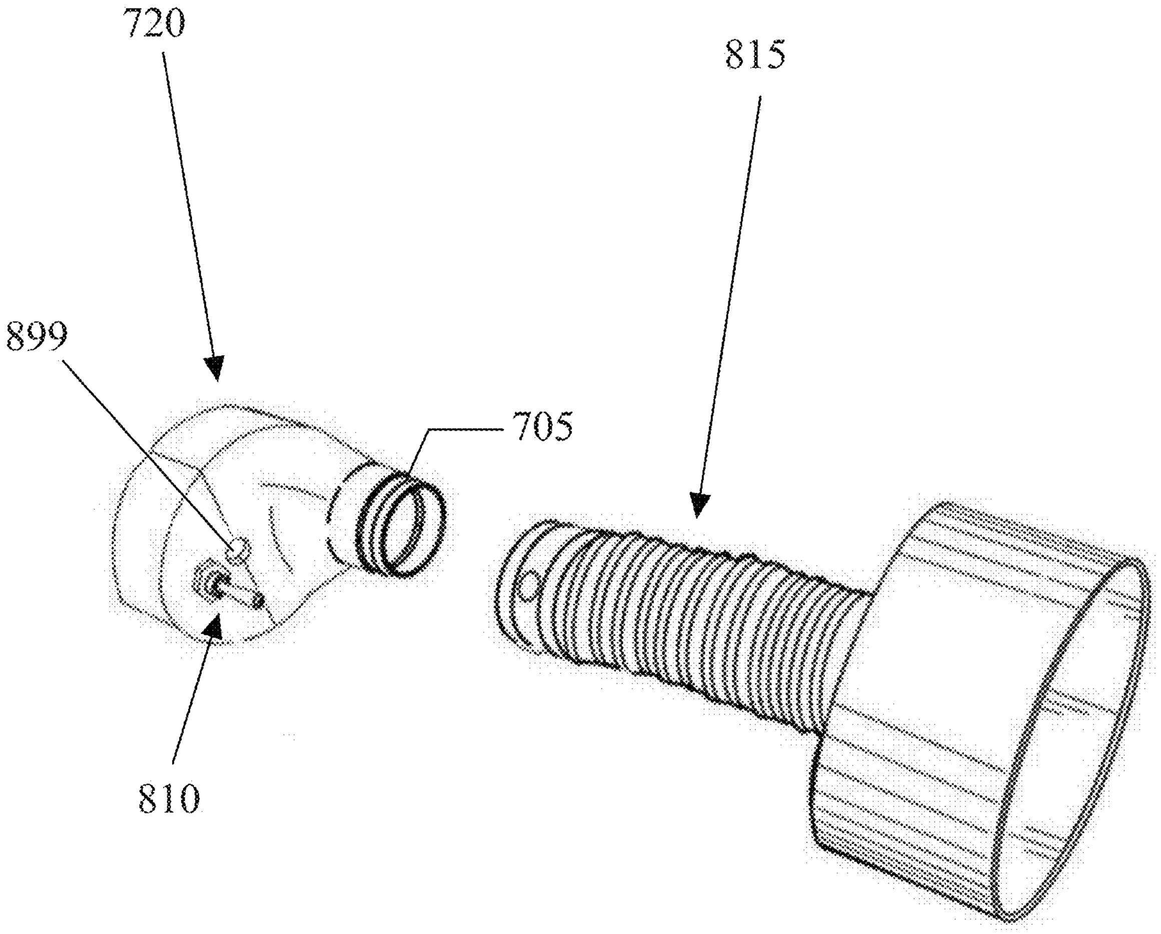
FIG. 8 is an illustration of one embodiment of a rear cover and vacuum receptacle.

FIG. 8 is an illustration of one embodiment of a power adapter and a vacuum receptacle. FIG. 8 shows a rear perspective view of power adapter 720, which may have vacuum attachment fixture 705 and multifunction switch 810.

Multifunction switch 810 may allow selection between a lower first SPM and a higher second SPM and may also turn modular clippers on and off. In other embodiments, the multifunction switch 810 may turn the vacuum on and off.

Vacuum attachment fixture 705 may allow collection system 815 to be attached to the power adapter 720 to collect and remove cut hair. Collection system 815 may be a vacuum, pump, or the like.

Power adapter 720 may contain a battery or may contain A/C power components that have a cord that runs through power portal 899.

Figure 9:
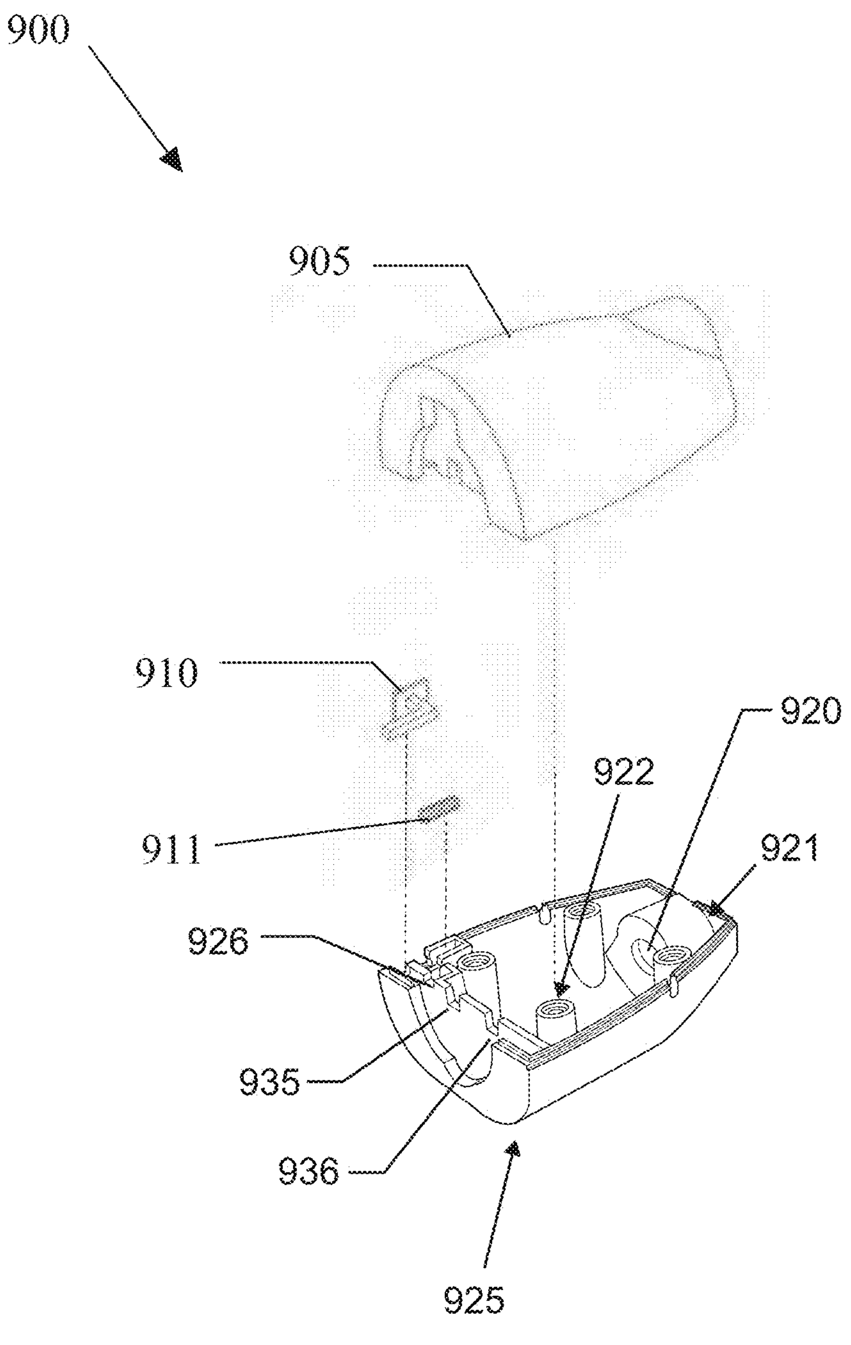
FIG. 9 is an illustration of an exploded view of one embodiment of a power adapter for the modular clippers of the present disclosure.

FIG. 9 is an illustration of an exploded view of one embodiment of a power adapter for the modular clippers of the present disclosure. As shown in FIG. 9, power adapter 900 may include upper housing 905, lower housing 925, and battery cavity 922. Lower housing 925 may include charge port 920 and charge connection port 921, which may be USB, USB-C, or the like. The battery may provide power through adapter power contacts 935, 936.

Power adapter 900 may include spring 911, slidable locking lever 910, and locking feature 926, which may operate as a quick connect and disconnect mechanism for releasably joining power adapter 900 to the rear of the main body of the modular clippers of the present disclosure.

In one embodiment, slidable locking lever 910 retracts into adapter 900 and spring 911 forcibly pushes slidable locking lever 910 into locking feature 926.

Figure 10A:
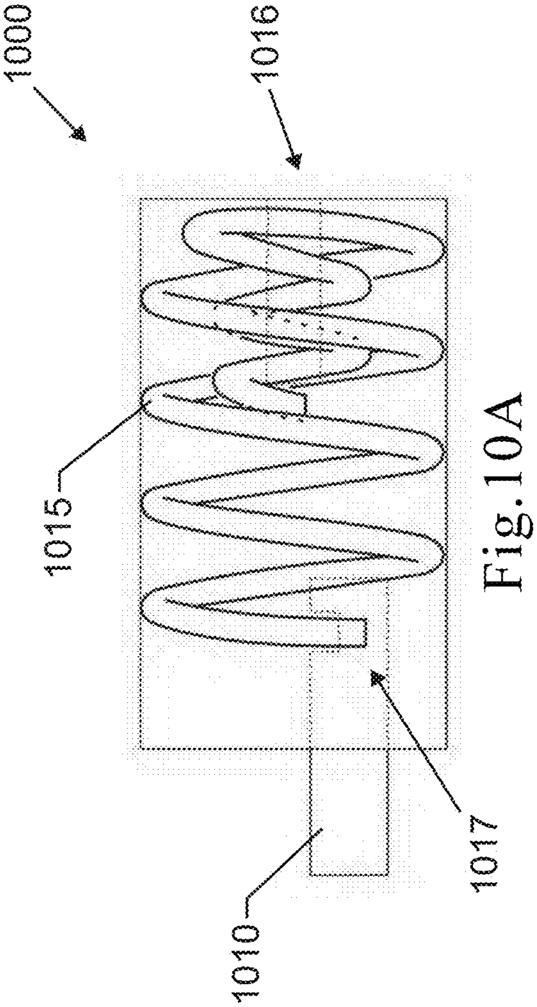
FIG. 10A is an illustration of a transparent side view of one embodiment of an eccentric motor cam.

FIG. 10A is an illustration of a transparent side view of one embodiment of an eccentric motor cam. Motor cam 1000 may be a resin composite structure that is formed around absorption structure 1015. Cam 1000 may also have offset pin 1010 and drive shaft cavity 1016. Offset pin 1010 may be offset by 0.100 inches to 0.500 inches from the center radial line of cam 1000.

In one embodiment, absorption structure 1015 may be a spring or filament. Absorption structure 1015 may absorb vibration, stress, and impact, and may prevent fracture, breakage, and slippage of motor cam 1000. Motor cam 1000 may attach to an electric motor (shown in FIG. 1) using friction. As shown, motor cam 1000 may have a D-shaped cylindrical specifically shaped drive shaft cavity 1016 that may matingly engage with the drive shaft of the motor.

In one embodiment, offset pin 1010 may include a notch 1017 that may physically engage with absorption structure 1015 to further stabilize and strengthen cam 1000 and offset pin 1010.

Figure 10B:
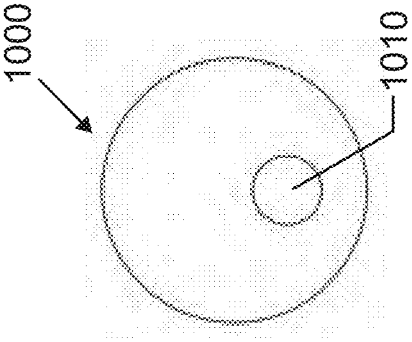
FIG. 10B is an illustration of a top view of one embodiment of an eccentric motor cam.

FIG. 10B is an illustration of a top view of one embodiment of an eccentric motor cam. Cam 1000 is shown with offset pin 1010.

Figure 10C:
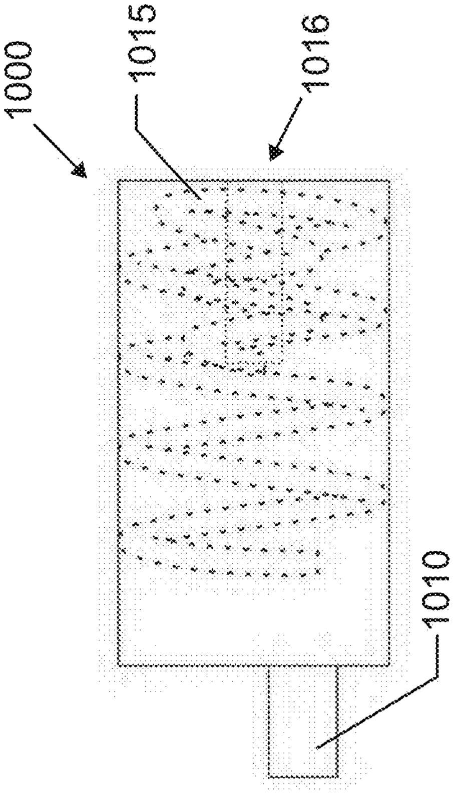
FIG. 10C is an illustration of a side view of one embodiment of an eccentric motor cam.

FIG. 10C is an illustration of a side view of one embodiment of an eccentric motor cam. The absorption structure 1015 is shown embedded in cam 1000. The offset pin 1010 and cavity 1016 are also shown.

Figure 10D:
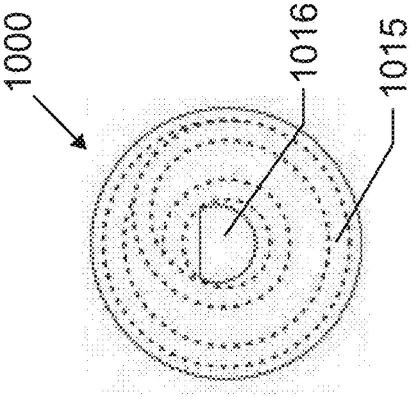
FIG. 10D is an illustration of a bottom view of one embodiment of an eccentric motor cam.

FIG. 10D is an illustration of a bottom view of one embodiment of an eccentric motor cam. The absorption structure 1015 is shown embedded in cam 1000. D-shaped cavity 1016 is also shown.

Figure 11:
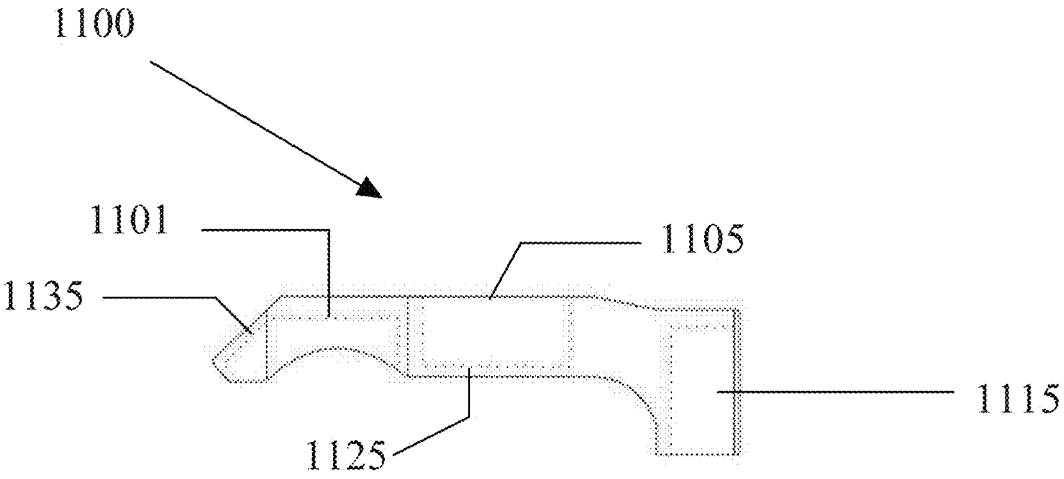
FIG. 11 is an illustration of a cross-section side view of one embodiment of a drive lever.

FIG. 11 is an illustration of a cross-section side view of one embodiment of a drive lever. As shown in FIG. 11, drive lever 1100 may have metal inserts 1101, 1115, 1125, and 1135 that may provide additional strength to drive lever 1100, which may generally be made of plastic, metal, or composite materials. Drive lever 1100 may have a drive lever bearing components cavity 1105 that is configured to matingly engage with the drive lever bearing components.

Figure 12:
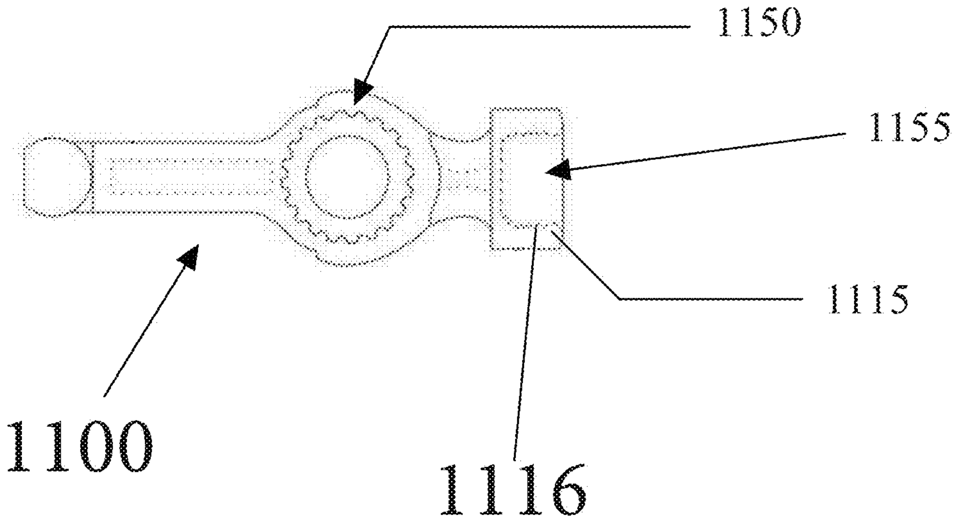
FIG. 12 is an illustration of a top view of one embodiment of a drive lever.

FIG. 12 is an illustration of a top view of one embodiment of a drive lever. As shown in FIG. 12, drive lever 1100 may incorporate inner cavity texturizing such as ribs 1150 to provide strength and wear resistance and reduce wrenching, slippage, and loss of strokes per minute with respect to the drive lever bearing. Ribs 1150 may matingly engage with, or otherwise fit with, a drive lever bearing, such as drive lever bearing 340, as shown in FIG. 3, or drive lever bearing 440, as shown in FIG. 4.

Drive lever 1100 may include a motor cam cavity 1155, which may be reinforced with metal insert 1115. The motor cam cavity 1155 may engage with offset pin 1010, which translates the rotational force of the offset pin 1010 into a side-to-side stroking motion of the front tip of the drive lever 1100. This, in turn, drives the side-to-side motion of the blade, which, in conjunction with second, static blade, cuts the hair. The design of drive lever 1100 efficiently translates the high torque of the motor into high strokes per minute and allows for heavy duty use on tangled or thick fur. The design of drive lever 1100 also prevents slippage and breakage, in conjunction with allowing easy replacement of parts that do get worn down.

As shown in FIG. 12, metal insert 1115 may preferably have an interior surface that is ribbed or texturized 1116. This allows for further wear reduction as the offset pin engages with the metal insert 1115 to move the drive lever 1100 from side to side.

Figure 13:
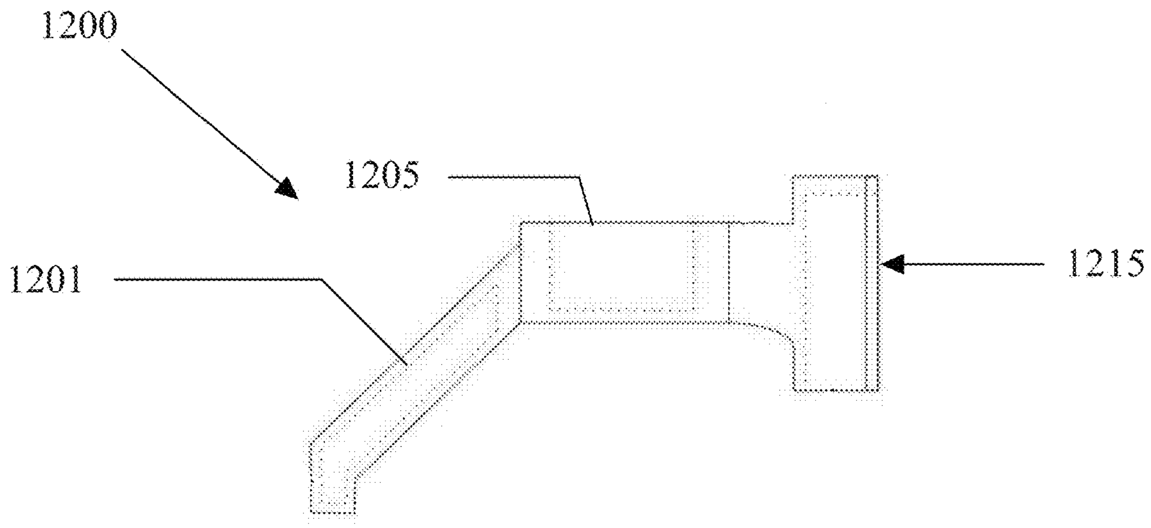
FIG. 13 is an illustration of a cross-section side view of another embodiment of a drive lever.

FIG. 13 is an illustration of a cross-section side view of another embodiment of a drive lever. As shown, in FIG. 13, drive lever 1200 may include metal inserts 1201, 1205, and 1215 that may provide additional strength. A right-angle lever 1200 may allow modular angular blade options from 75 to 125 degrees for modular clippers.

Figure 14:
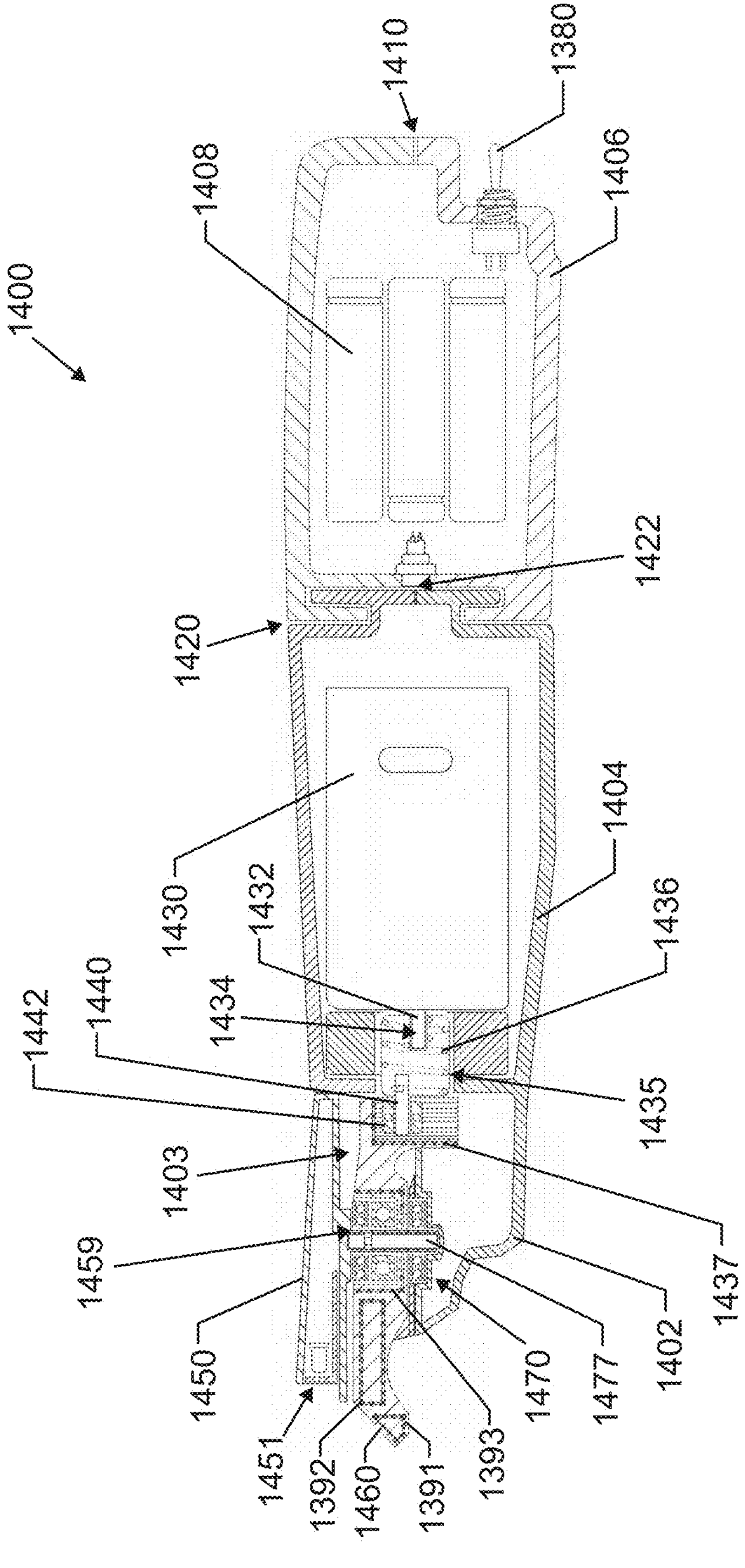
FIG. 14 is an illustration of a cross-section view of one embodiment of a modular clipper.

FIG. 14 is an illustration of a cross-section view of one embodiment of a modular clipper. As shown in FIG. 14, the modular clipper 1400 may comprise lower housing 1402, upper housing 1403, motor housing 1404, power adapter 1406, battery 1408, charge connection port 1410, quick connector 1420, motor 1430, drive shaft 1432, D-shaped cavity 1434, cam 1435, absorption structure 1436, offset pin 1440, pin bearing 1442, cover plate 1450, lights 1451, drive post 1459, drive lever 1460, drive lever bearing components 1470, and drive post pin 1477.

FIG. 14 shows that motor 1430 may be powered by battery 1408, which may be recharged through charge connection port 1410. The motor 1430, may turn drive shaft 1432, which in turn may turn cam 1435, which may cause offset pin 1440 to rotate within pin bearing 1442 such that drive lever 1460 is stroked back and forth horizontally at a fulcrum comprised of drive post 1459, drive lever bearing components 1470, and drive post pin 1477.

FIG. 14 shows how the modular clippers 1400 may quickly be disconnected from power adapter 1406 and cover plate 1450.

As shown, power switch 1380 may be part of power adapter 1406 and may be used to turn on and off the modular clippers, control the speed of the clippers, and/or turn on and off the light.

FIG. 14 also shows that drive lever 1460, which may be made from plastic, may be reinforced with metal via the inclusion of metal inserts, including tip metal insert 1391, shaft metal insert 1392, bearing components cavity insert 1393, and motor cam cavity insert 1437. As shown, inserts, 1391, 1392, 1393, 1437 may be strategically placed at the points in drive lever 1460 that undergo the most wear and force.

Figure 15:
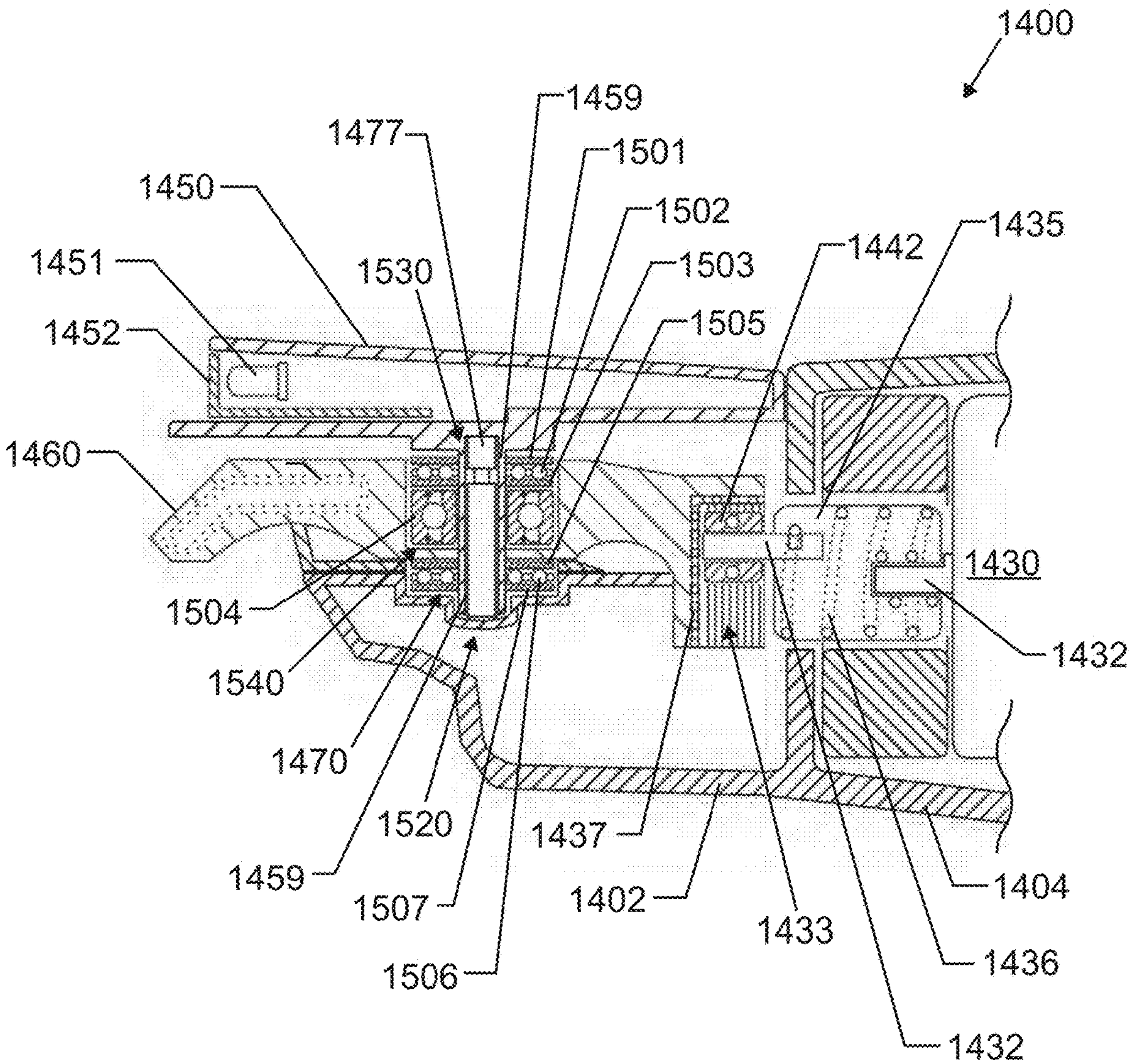
FIG. 15 is an illustration of a close-up illustration of a cross-section view of one embodiment of a modular clipper.

FIG. 15 is an illustration of a close-up illustration of a cross-section view of one embodiment of a modular clipper. As shown in FIG. 15, the modular clipper 1400 may comprise lower housing 1402, motor housing 1404, motor 1430, drive shaft 1432, motor cam cavity 1433, cam 1435, absorption structure 1436, offset pin 1440, pin bearing 1442, cover plate 1450, lights 1451, light lens 1452, drive post 1459, drive lever 1460, drive lever bearing components 1470, drive post pin 1477, metal insert 1437, lower housing bearing platform 1520, upper lever bearing platform 1530, and drive lever bearing components cavity 1540. FIG. 15 shows that drive post pin 1477 may extend from lower housing bearing platform 1520 to upper lever bearing platform 1530 and may matingly fit into drive post 1459, which also may extend from lower housing bearing platform 1520 to upper lever bearing platform 1530. The drive lever bearing components 1470, which may matingly fit around drive post 1459, as shown, may include upper thrust top plate 1501, upper ball bearing thrust plate 1502, upper thrust bottom plate 1503, drive lever bearing 1504, lower thrust top plate 1505, lower ball bearing thrust plate 1506, and lower thrust bottom plate 1507. As shown, upper thrust top plate 1501, upper ball bearing thrust plate 1502, upper thrust bottom plate 1503, drive lever bearing 1504 may matingly fit within drive lever bearing components cavity 1540, with lower thrust top plate 1505, lower ball bearing thrust plate 1506, and lower thrust bottom plate 1507 preferably being just under drive lever bearing components cavity 1540. In this manner, drive post pin 1477, drive post 1459, and drive lever bearing components 1470 may be the pivot or fulcrum for drive lever 1460 to stroke back and forth in a horizontal manner, when motor 1430 is activated.

Figure 16:
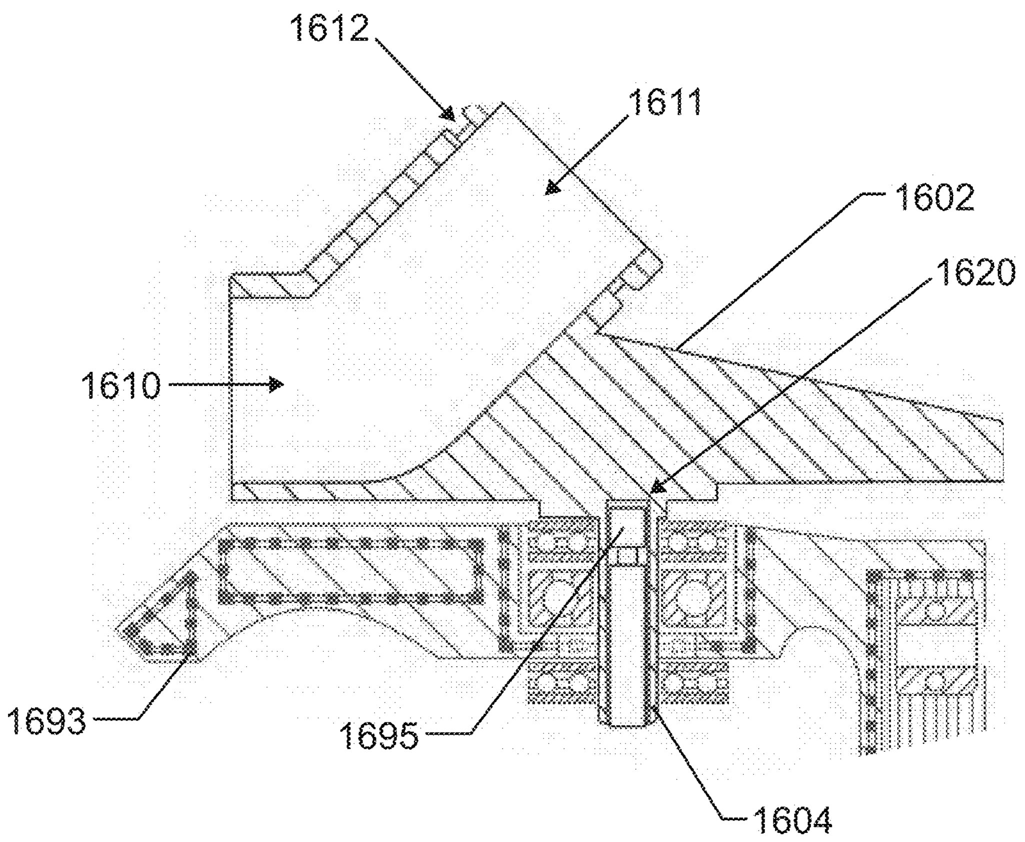
FIG. 16 is an illustration of a cross-section view of one embodiment of the cover plate of the modular clippers of the present disclosure.

FIG. 16 is a cross-section view of one embodiment of the cover plate of the modular clippers of the present disclosure. As shown, cover plate 1602 may include drive post 1604, vacuum inlet 1610, vacuum outlet 1611, attachment fixture 1612, and drive post cavity 1620. As shown, drive post cavity 1620 may matingly accept drive post pin 1695, which stabilizes the strokes of drive lever 1693. Vacuum inlet 1610 may preferably be positioned at the front of cover plate 1602 so as to be positioned to suction up loose hair/fur that is cut by the modular clippers before the hair/fur falls to the ground. The hair/fur may then exit the cover plate 1602 through vacuum outlet 1611 by being suctioned out by a vacuum or vacuum hose that is attached to attachment fixture 1612.

Figure 17:
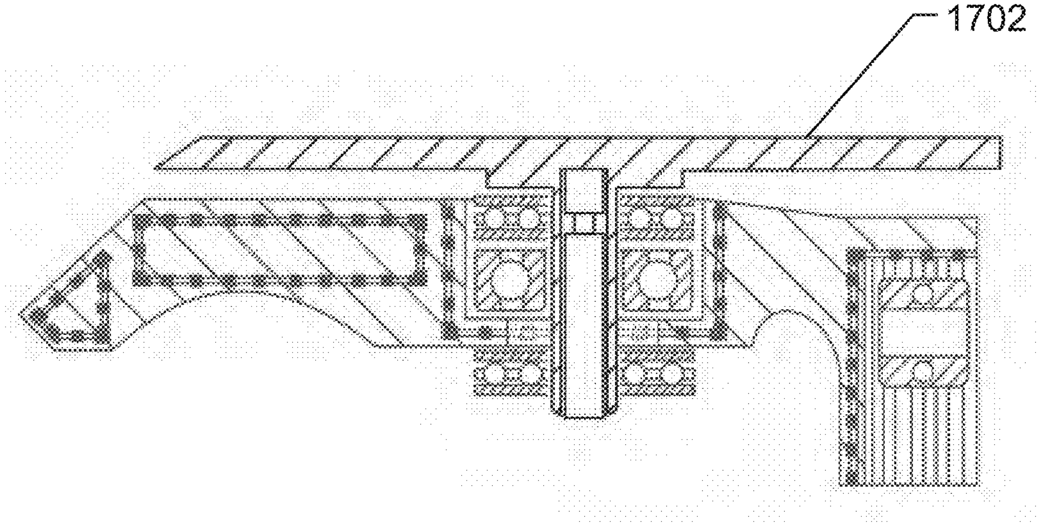
FIG. 17 is an illustration of a cross-section view of one embodiment of a cover plate of the modular clippers of the present disclosure.

FIG. 17 is an illustration of a cross-section view of one embodiment of a cover plate of the modular clippers of the present disclosure. As shown, the cover plate 1702 may be modular and a standard or plain cover plate with no lights or vacuum.

Figure 18:
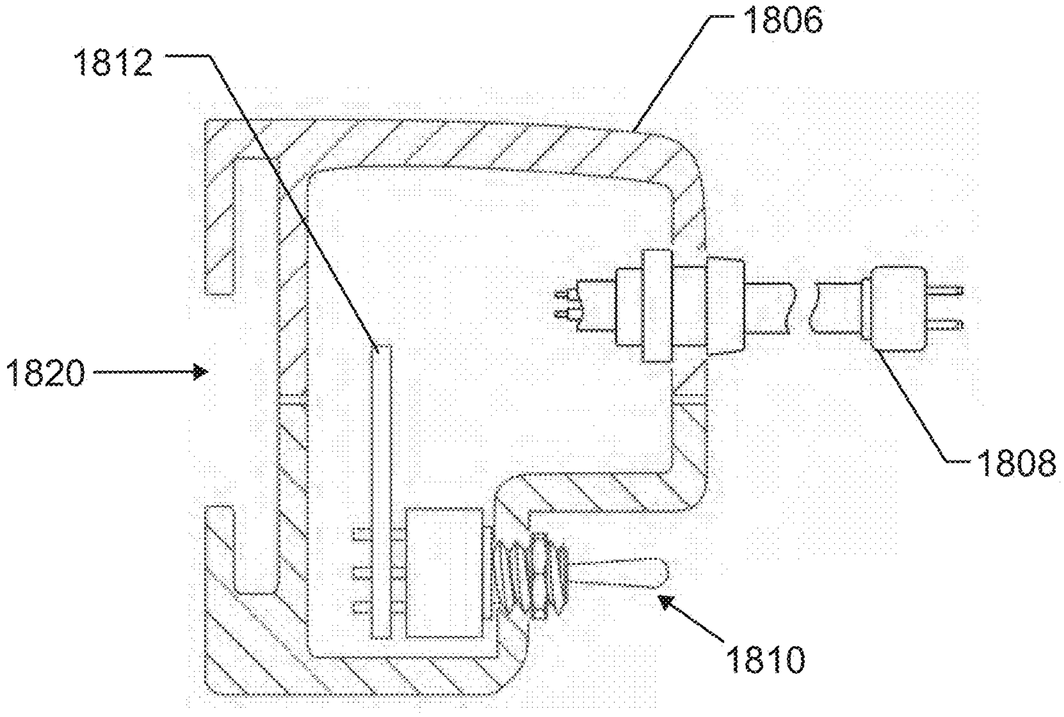
FIG. 18 is a cross-section view of one embodiment of a modular corded power adapter for the modular clippers of the present disclosure.

FIG. 18 is a cross-section view of one embodiment of a modular corded power adapter for the modular clippers of the present disclosure. As shown, the corded power adapter 1806 may comprise power cord 1808, power switch 1810, printed circuit board 1812, and quick connector 1820. Power cord 1808 may be configured to be plugged into a power source, such as a wall socket. The power switch 1810 may be used to turn on and off the modular clippers and control the speed of the clippers. The quick connector 1820 may allow the corded power adapter 1806 to be removed and swapped for a battery adapter or an adapter that includes a vacuum.

Figure 19:
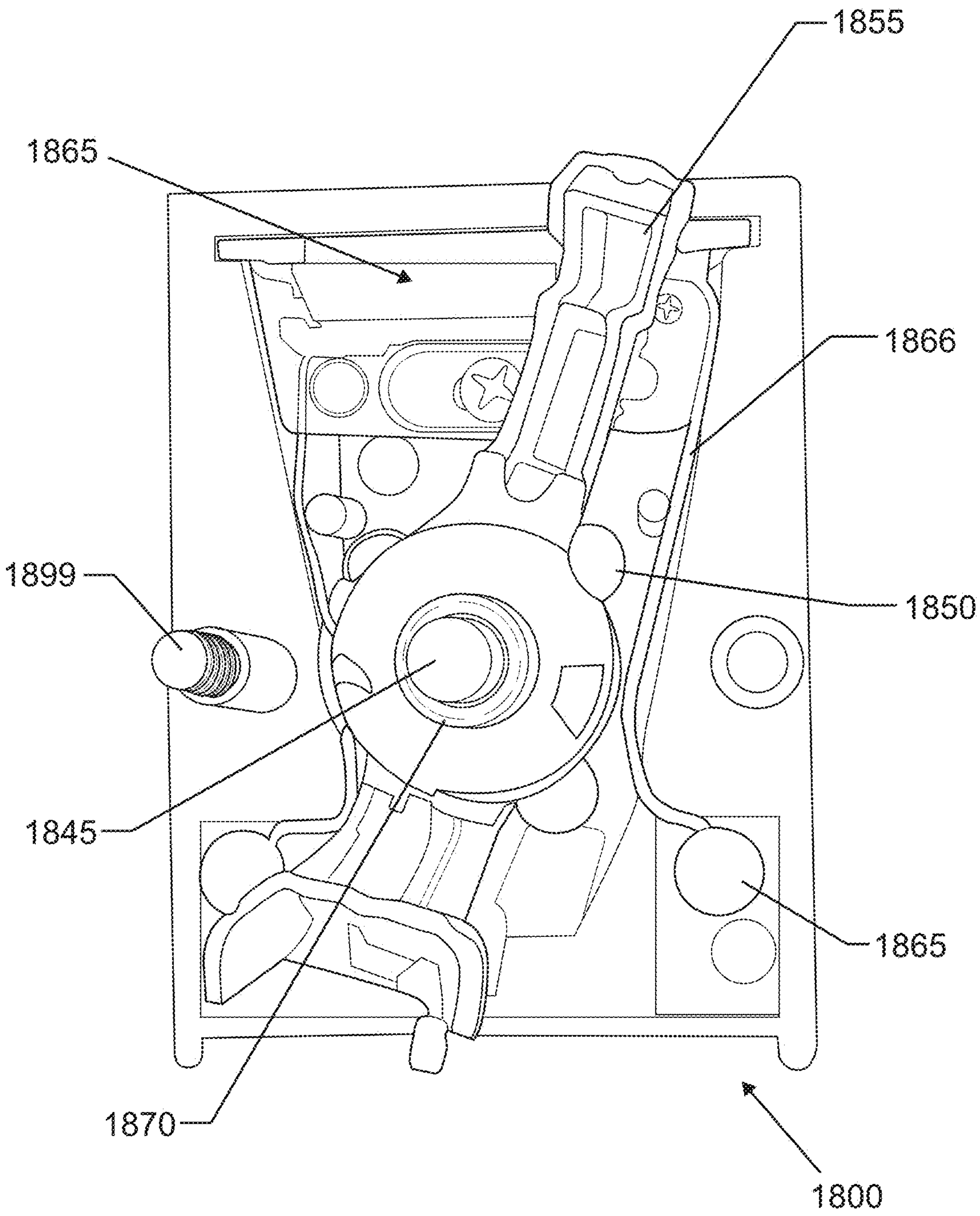
FIG. 19 is an illustration of a bottom view of one embodiment of a cover plate.

FIG. 19 is an illustration of a bottom view of one embodiment of a cover plate. As shown, cover plate 1800 may include LED light 1865, wiring 1866, drive post 1870, electrical contacts 1865, drive post pin 1845, thrust pins 1850, drive lever 1855, and fastener 1899. As shown, wiring 1866 may deliver power from electrical contacts 1865 to light 1865. Fastener 1899 is shown as a removeable screw, which may be used to removeably attach cover plate 1800 to the main body and/or the upper and lower housings of the modular clippers. FIG. 18 also shows how drive lever 1855 may be swapped out for a different drive lever easily and efficiently.

Figure 20:
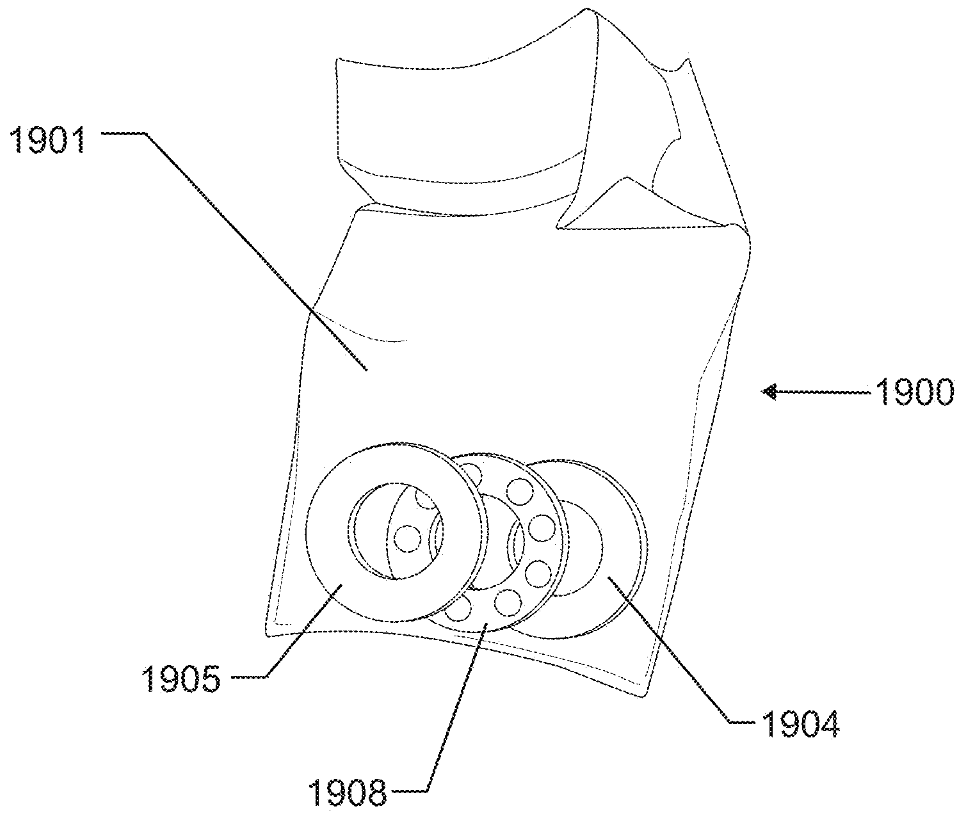
FIG. 20 is an illustration of one embodiment of a bearing tune-up kit.

FIG. 20 is an illustration of one embodiment of a bearing tune-up kit. In one embodiment, the parts most likely to wear out may be provided as tune-up kit 1900, which may include two thrust plates 1904, 1905, and ball bearing thrust plate 1908 packaged in bag 1901. This may allow a user to easily and efficiently replace the parts most likely to wear out in the modular clippers.

Figure 21:
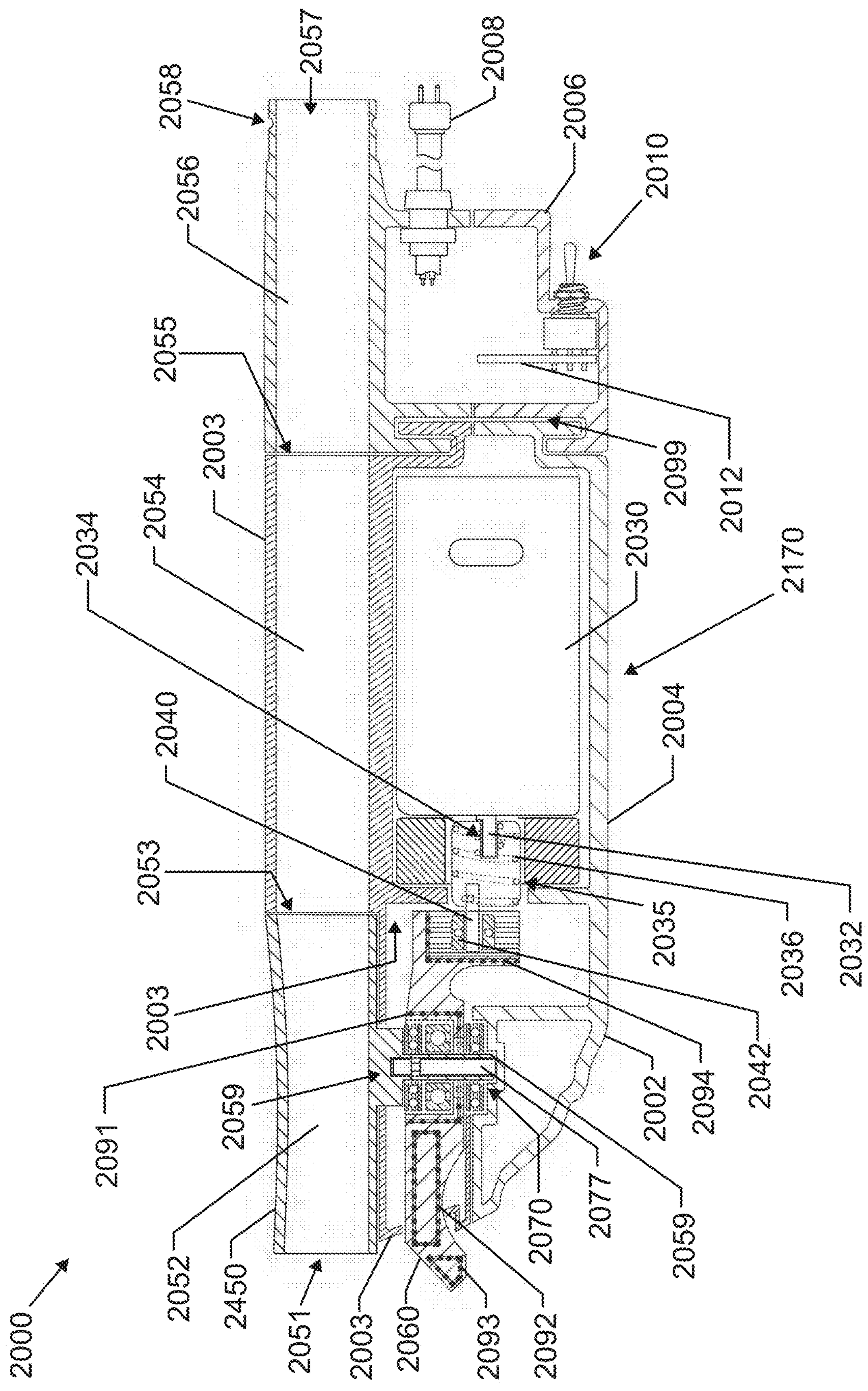
FIG. 21 is an illustration of a cross-section view of one embodiment of a vacuum modular clipper.

FIG. 21 is an illustration of a cross-section view of one embodiment of a vacuum modular clipper. As shown in FIG. 21, the modular clipper 2000 may comprise main body 2170, power adapter 2006, and cover plate 2050.

Cover plate 2050 may comprise nozzle or vacuum inlet 2051, vacuum conduit 2052, vacuum cover plate to main body transition 2053, drive post 2059, drive lever bearing components 2070, and drive post pin 2077.

Power adapter 2006 may be a corded vacuum power adapter that may include power cord 2008, power/vacuum switch 2010, printed circuit board 2012, vacuum main body to power adapter transition 2055, vacuum outlet 2057, and attachment fixture 2058. The power switch 2010 may be used to turn on and off the vacuum, turn on and off the modular clippers, control the speed of the clippers, and/or control the power of the vacuum. The vacuum or suction source may be externally powered or may be powered by power adapter 2006.

Main body 2170, as shown, may include lower housing 2002, upper housing 2003, motor housing 2004. Main body 2170 may enclose or substantially enclose motor 2030, drive shaft 2032, D-shaped cavity 2034, cam 2035, absorption structure 2036, offset pin 2040, pin bearing 2042, vacuum conduit 2054, and drive lever 2060. As shown, vacuum conduit 2054 may align with vacuum conduits 2052, 2056 to form a vacuum conduit that passes the suctioned up hair/fur from vacuum inlet 2051 to outlet 2057 when a vacuum or source of suction is attached to attachment fixture 2058.

Motor 2030 may be powered by power adapter 2006, through wiring that is not shown. Motor 2030 may turn drive shaft 2032, which in turn may operate cam 2035, which may cause offset pin 2040 to rotate within pin bearing 2042 such that drive lever 2060 is stroked back and forth horizontally at a pivot point comprised of drive post 2059, drive lever bearing components 2070, and drive post pin 2077.

FIG. 21 shows how the main body 2170 may quickly be disconnected from power adapter 2006 at quick twist lock connector 2099.

FIG. 21 also shows that drive lever 2060, which may be made from plastic, may be reinforced with metal via the inclusion of metal inserts, including tip metal insert 2093, shaft metal insert 2092, bearing components cavity insert 2091, and motor cam cavity insert 2094. As shown, inserts, 2091, 2092, 2093, 2094 may be strategically placed at the points in drive lever 2060 that undergo the most wear and force.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. An improved drive lever and drive lever bearing components for a modular clipper, comprising:
- a main body;
- a first cover plate;
- a first drive lever; and
- a first plurality of drive lever bearing components;
  - wherein said first cover plate is operatively and removeably attached to an upper housing of said main body;
  - wherein said first cover plate comprises an upper lever bearing platform, a drive post, one or more thrust pin sockets, one or more electrical contact sockets, and one or more cover plate electrical contacts;
  - wherein a lower housing of said main body comprises a lower housing bearing platform and a lower housing drive post receiver cavity;
  - wherein said first plurality of drive lever bearing components comprise: an upper thrust top plate; an upper ball bearing thrust plate; an upper thrust bottom plate; a drive lever bearing; a drive post pin; a lower thrust top plate; a lower ball bearing thrust plate; and a lower thrust bottom plate; and
  - wherein said first plurality of drive lever bearing components are configured to matingly engage with each other and with said first drive lever, said drive post, said upper lever bearing platform, and said lower housing bearing platform, such that said first drive lever is configured to be pivoted back and forth.

2. The improved drive lever and drive lever bearing components for a modular clipper of claim 1, wherein said first cover plate, said first plurality of drive lever bearing components, and said first drive lever are configured to be removeable from said main body and replaced with a second cover plate, a second plurality of drive lever bearing components, and a second drive lever.

3. The improved drive lever and drive lever bearing components for a modular clipper of claim 1, wherein said first cover plate is configured to be disconnected from said main body and replaced with a second cover plate.

4. The improved drive lever and drive lever bearing components for a modular clipper of claim 1, wherein said first cover plate is selected from the group of cover plates consisting of: a plain cover plate; a light cover plate; a vacuum cover plate; and a light and vacuum cover plate.

5. The improved drive lever and drive lever bearing components for a modular clipper of claim 1, wherein said drive post pin is configured to matingly engage with said lower housing drive post receiver cavity, said drive lever bearing, and said drive post cavity.

6. The improved drive lever and drive lever bearing components for a modular clipper of claim 5, wherein said first plurality of drive lever bearing components further comprise one or more thrust pins, which are configured to matingly engage with said one or more thrust pin sockets.

7. The improved drive lever and drive lever bearing components for a modular clipper of claim 6, wherein said first cover plate comprises:

one or more lights.

8. The improved drive lever and drive lever bearing components for a modular clipper of claim 7, wherein said one or more lights are one or more light emitting diodes.

9. The improved drive lever and drive lever bearing components for a modular clipper of claim 6, wherein said first cover plate further comprises:

a cover plate vacuum conduit; and a nozzle;

wherein said upper housing of said main body comprises an upper housing vacuum conduit; and wherein said cover plate vacuum conduit, said nozzle, and said upper housing vacuum conduit are in fluidic communication, such that when a vacuum source is removeably connected to said vacuum receptacle, said nozzle is configured to suction in a plurality of loose hairs that are cut by said modular clipper.

10. The improved drive lever and drive lever bearing components for a modular clipper of claim 9, wherein said first cover plate further comprises one or more lights.

11. The improved drive lever and drive lever bearing components for a modular clipper of claim 1, wherein said first drive lever comprises a plurality of metal inserts.

* * * * *